United States Patent
Metzger et al.

(10) Patent No.: US 7,576,770 B2
(45) Date of Patent: Aug. 18, 2009

(54) SYSTEM FOR A PLURALITY OF VIDEO CAMERAS DISPOSED ON A COMMON NETWORK

(76) Inventors: Raymond Metzger, 7800 IH-10 W., San Antonio, TX (US) 78230; John Baird, 7800 IH-10 West, San Antonio, TX (US) 78230; Adrian Alvarado, 7800 IH-10 W., San Antonio, TX (US) 78230; Ray Hollida, 780 IH-10 W., San Antonio, TX (US) 78230; David Monroe, 7800 IH 10 West, San Antonio, TX (US) 78230

( * ) Notice: Subject to any disclaimer, the term of this patent is extended or adjusted under 35 U.S.C. 154(b) by 727 days.

(21) Appl. No.: 10/776,129

(22) Filed: Feb. 11, 2004

(65) Prior Publication Data

US 2006/0136972 A1 Jun. 22, 2006

Related U.S. Application Data

(60) Provisional application No. 60/446,583, filed on Feb. 11, 2003.

(51) Int. Cl.
H04N 7/18 (2006.01)
(52) U.S. Cl. .......................... 348/143; 348/47; 348/159; 348/211.11; 348/211.8; 348/211.13; 725/105
(58) Field of Classification Search .................. 348/47, 348/50, 139, 143, 201, 208.5, 211.11, 705–706, 348/153, 156, 211.4–211.8, 211.13, 159, 348/295; 725/105, 140, 1, 140.1
See application file for complete search history.

(56) References Cited

U.S. PATENT DOCUMENTS

| 4,163,283 A | 7/1979 | Darby |
| 4,179,695 A | 12/1979 | Levine et al. |
| 4,197,526 A | 4/1980 | Levine |
| 4,197,536 A | 4/1980 | Levine |

(Continued)

FOREIGN PATENT DOCUMENTS

EP 209397 1/1987

(Continued)

OTHER PUBLICATIONS

Apr. 1966, Apollo Unified S-Band System, NASA-Goddard Space Flight Center, Greenbelt, Maryland.

(Continued)

*Primary Examiner*—James M Hannett
*Assistant Examiner*—Usman Khan

(57) ABSTRACT

A plurality of cameras are adapted to utilize Ethernet network protocol for the physical layer and UDP/IP for the network and transport layers permitting multiple compressed signals representing different degrees of image resolution, compression type of compressed bit rate to be simultaneously transmitted. These multiple video streams may be combined into one composite stream for network transmission or may be maintained as separate and distinct video or still frame streams throughout the network. The digitizer, compressor and network interface can be integral to a camera or can be a separate unit. Video or images networked in this manner may be selective viewed on an operator console or may be received by a network server for storage, analysis and subsequent retrieval.

1 Claim, 12 Drawing Sheets

U.S. PATENT DOCUMENTS

| | | |
|---|---|---|
| 4,516,125 A | 5/1985 | Schwab et al. |
| 4,831,438 A | 5/1989 | Bellman, Jr. et al. |
| 4,845,629 A | 7/1989 | Murge |
| 4,857,912 A | 8/1989 | Everett, Jr. et al. |
| 4,891,650 A | 1/1990 | Sheffer |
| 4,910,692 A | 3/1990 | Outram |
| 5,027,104 A | 6/1991 | Reid |
| 5,027,114 A | 6/1991 | Kawashime et al. |
| 5,091,780 A | 2/1992 | Pomerleau |
| 5,109,278 A | 4/1992 | Erickson |
| 5,111,291 A | 5/1992 | Erickson |
| 5,166,746 A | 11/1992 | Sato et al. |
| 5,218,367 A | 6/1993 | Sheffer et al. |
| 5,243,340 A | 9/1993 | Norman et al. |
| 5,243,530 A | 9/1993 | Stanifer et al. |
| 5,268,698 A | 12/1993 | Smith, Sr. et al. |
| 5,283,643 A | 2/1994 | Fujimoto |
| 5,321,615 A | 6/1994 | Frisbie et al. |
| 5,334,982 A | 8/1994 | Owen |
| 5,350,890 A | 9/1994 | Rose et al. |
| 5,351,194 A | 9/1994 | Rose et al. |
| 5,400,031 A | 3/1995 | Fitts |
| 5,408,330 A | 4/1995 | Squicciarini et al. |
| 5,432,838 A | 7/1995 | Purchase et al. |
| 5,440,337 A | 8/1995 | Henderson et al. |
| 5,440,343 A | 8/1995 | Parulski |
| 5,448,243 A | 9/1995 | Bethke et al. |
| 5,463,595 A | 10/1995 | Rodhall et al. |
| 5,469,371 A | 11/1995 | Bess |
| 5,497,149 A | 3/1996 | Fast |
| 5,508,736 A | 4/1996 | Cooper |
| 5,509,009 A | 4/1996 | Laycock |
| 5,530,440 A | 6/1996 | Denzer et al. |
| 5,553,609 A | 9/1996 | Chen et al. |
| 5,557,254 A | 9/1996 | Johnson et al. |
| 5,557,278 A | 9/1996 | Piccirillo et al. |
| 5,598,167 A | 1/1997 | Zijderhand |
| 5,612,668 A | 3/1997 | Scott |
| 5,627,753 A | 5/1997 | Brankin et al. |
| 5,629,691 A | 5/1997 | Jain |
| 5,636,122 A | 6/1997 | Shah et al. |
| 5,642,285 A | 6/1997 | Woo |
| 5,666,157 A | 9/1997 | Aviv |
| 5,670,961 A | 9/1997 | Tomita et al. |
| 5,677,979 A | 10/1997 | Squicciarini |
| 5,689,442 A | 11/1997 | Swanson et al. |
| 5,712,679 A | 1/1998 | Coles |
| 5,712,899 A | 1/1998 | Pace, II |
| 5,714,948 A | 2/1998 | Farmakis et al. |
| 5,742,336 A | 4/1998 | Lee |
| 5,751,346 A | 5/1998 | Dozler |
| 5,777,551 A | 7/1998 | Hess |
| 5,777,580 A | 7/1998 | Janky et al. |
| 5,793,416 A | 8/1998 | Rostoker et al. |
| 5,825,283 A | 10/1998 | Camhi |
| 5,835,059 A | 11/1998 | Nadel et al. |
| 5,850,180 A | 12/1998 | Hess |
| 5,867,804 A | 2/1999 | Pilley et al. |
| 5,917,405 A | 6/1999 | Joso |
| 5,926,210 A | 7/1999 | Hackett et al. |
| 5,933,098 A | 8/1999 | Haxton |
| 5,938,706 A | 8/1999 | Feldman |
| 5,974,158 A | 10/1999 | Auty et al. |
| 5,983,161 A | 11/1999 | Lemelson et al. |
| 5,999,116 A | 12/1999 | Evers |
| 6,002,427 A | 12/1999 | Kipust |
| 6,009,356 A | 12/1999 | Monroe |
| 6,067,571 A | 5/2000 | Igarashi et al. |
| 6,069,655 A | 5/2000 | Seeley |
| 6,078,850 A | 6/2000 | Kane et al. |
| 6,084,510 A | 7/2000 | Lemelson et al. |
| 6,092,008 A | 7/2000 | Bateman |
| 6,100,964 A | 8/2000 | De Cremiers |
| 6,133,941 A | 10/2000 | Ono |
| 6,154,658 A | 11/2000 | Caci |
| 6,157,317 A | 12/2000 | Walker |
| 6,181,373 B1 | 1/2001 | Coles |
| 6,195,609 B1 | 2/2001 | Pilley et al. |
| 6,226,031 B1 | 5/2001 | Barraclough et al. |
| 6,233,428 B1 * | 5/2001 | Fryer ........................ 434/308 |
| 6,246,320 B1 | 6/2001 | Monroe |
| 6,259,475 B1 | 7/2001 | Ramachandran et al. |
| 6,275,231 B1 | 8/2001 | Obradovich |
| 6,278,965 B1 | 8/2001 | Glass et al. |
| 6,282,488 B1 | 8/2001 | Castor et al. |
| 6,292,098 B1 | 9/2001 | Ebata |
| 6,356,625 B1 | 3/2002 | Castelani |
| 6,385,772 B1 | 5/2002 | Courtney |
| 6,424,370 B1 | 7/2002 | Courtney |
| 6,462,697 B1 | 10/2002 | Klamer et al. |
| 6,476,858 B1 | 11/2002 | Ramirez Diaz et al. |
| 6,504,479 B1 | 1/2003 | Lemons |
| 6,522,532 B2 | 2/2003 | Liao et al. |
| 6,525,761 B2 | 2/2003 | Sato et al. |
| 6,549,130 B1 | 4/2003 | Joso |
| 6,556,241 B1 | 4/2003 | Yoshimura et al. |
| 6,570,610 B1 | 5/2003 | Kipust |
| 6,591,068 B1 * | 7/2003 | Dietz ........................ 396/429 |
| 6,608,649 B2 * | 8/2003 | Suzuki et al. ............ 348/211.8 |
| 6,628,835 B1 | 9/2003 | Brill |
| 6,646,676 B1 | 11/2003 | DeGrace |
| 6,662,649 B1 | 12/2003 | Knight et al. |
| 6,675,386 B1 * | 1/2004 | Hendricks et al. ........... 725/105 |
| 6,698,021 B1 | 2/2004 | Amini |
| 6,720,990 B1 | 4/2004 | Walker et al. |
| 7,065,140 B1 * | 6/2006 | Ritter et al. ............ 375/240.25 |
| 7,113,971 B1 | 9/2006 | Ohi et al. |
| 2001/0052132 A1* | 12/2001 | Fryer ........................ 725/105 |
| 2002/0097917 A1* | 7/2002 | Nelson et al. ................ 382/239 |
| 2002/0141732 A1* | 10/2002 | Reese et al. .................... 386/46 |
| 2003/0025599 A1* | 2/2003 | Monroe ...................... 340/531 |
| 2003/0058934 A1* | 3/2003 | Koto et al. ............. 375/240.01 |
| 2003/0071899 A1 | 4/2003 | Joso |
| 2003/0120802 A1* | 6/2003 | Kohno ........................ 709/237 |
| 2004/0068583 A1* | 4/2004 | Monroe et al. ............... 709/246 |
| 2005/0055727 A1 | 3/2005 | Creamer et al. |
| 2005/0130803 A1 | 6/2005 | Rastegar |
| 2005/0138083 A1 | 6/2005 | Smith-Semedo et al. |

FOREIGN PATENT DOCUMENTS

| | | |
|---|---|---|
| EP | 220752 | 5/1987 |
| EP | 232031 | 8/1987 |
| EP | 532110 | 3/1993 |
| EP | 209397 | 7/1993 |
| EP | 613109 | 8/1994 |
| EP | 613110 | 8/1994 |
| EP | 613111 | 8/1994 |
| EP | 744630 | 5/1996 |
| EP | 744630 | 11/1996 |
| EP | 785536 | 7/1997 |
| EP | 613111 | 8/1998 |
| JP | 6-301898 | 10/1994 |
| JP | 9-251599 | 9/1997 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO97/23096 | 6/1997 |
| WO | WO97/37336 | 10/1997 |

| | | |
|---|---|---|
| WO | WO9737336 | 10/1997 |
| WO | WO98/52174 | 11/1998 |
| WO | WO00/36807 | 6/2000 |

OTHER PUBLICATIONS

Nov. 24, 1976, TELEXIS ViaNet General Information Booklet Version 1.3.

2000, ViaNet 3000 Administrator's Manual Version 1.1- NetXpress Video by TELEXIS, Kanata, Ontario, Canada.

1999 Vianet 3000 Operator Manual Version 1.0—NetXpress Video by TELEXIS, Kanata, Ontario, Canada.

1999 ViaNet 3000 Administrator Manual Version 1.0—NetXpress Video by TELEXIS, Kanata, Ontario, Canada.

1999 ViaNet 3000 Instruction Manual Operator's Revision 1—NetXpress Video by TELEXIS, Kanata, Ontario, Canada.

* cited by examiner

SYSTEM FOR A PLURALITY OF VIDEO CAMERAS DISPOSED ON A COMMON NETWORK

CROSS REFERENCE TO RELATED APPLICATIONS

This application claims the priority of U.S. Provisional Application Ser. No. 60/446,583, filed on Feb. 11, 2003.

BACKGROUND OF THE INVENTION

1. Field of the Invention

The subject invention is generally related to a surveillance system having a plurality of cameras and is specifically directed to a system wherein the cameras are connected to a common network for transmission of stills and images to a remote location via IP or similar protocols.

2. Discussion of the Prior Art

Prior art systems have described a system containing a plurality of video camera disposed on a common network with a number of cameras disposed around a location to be monitored. Each camera produces a video signal representing the scene of interest. The video signal is digitized by a digitizer, compressed by a compressor and transmitted to a network via a network interface.

SUMMARY OF THE INVENTION

The subject invention is directed to a system wherein multiple compressors are employed to compress the captured image into a plurality of different compressed signal representing different degrees of image resolution, compression typed, or compressed bit rate. These multiple video streams may be combined into one composite stream for network transmission, or may be maintained as separate and distinct video or still frame streams throughout the network. Video images thus networked may selectively viewed on an operator console consisting of a person computer and monitor or may be received by a network server for storage, analysis and subsequent retrieval via disk storage or tape storage. In the preferred embodiment the camera uses Ethernet working protocol. Using OSI hierarchy, Ethernet is used for the physical layer, and UDP/IP is used for the network and transport layers. Networks may be wired, fiber or wireless. Other network protocols and topologies may also be used.

DETAILED DESCRIPTION OF THE INVENTION

Overview

Figure 1:
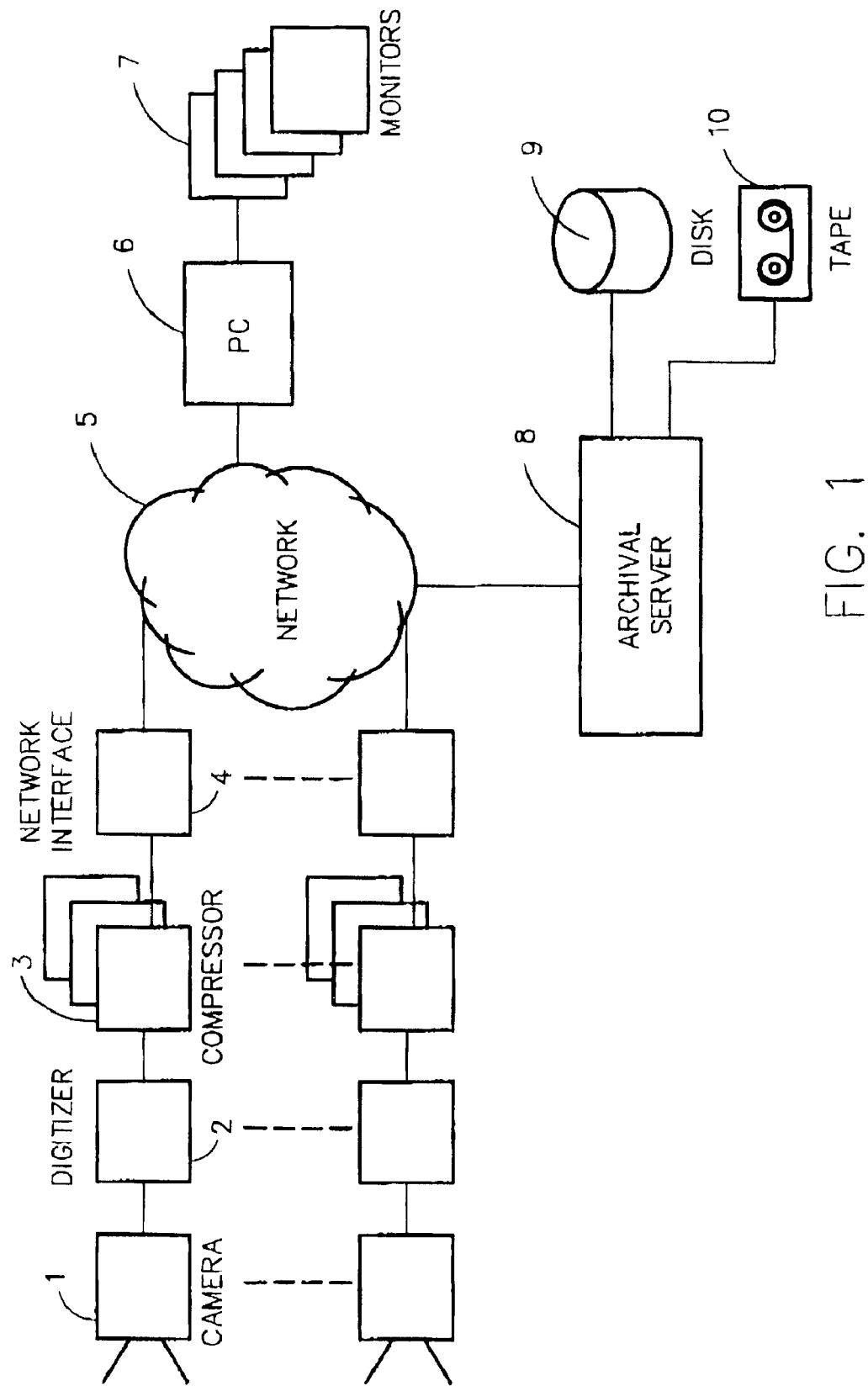
FIG. 1 is an overview of a prior art system.

Previous patent applications have described a system containing a plurality of video cameras disposed on a common network. FIG. 1 illustrates the overall concept. A number of cameras 1 are disposed around a location to be monitored. Each camera produces a video signal representing the scene of interest. The video signal is digitized by digitizer 2, compressed by compressor 3, and transmitted to a network 5 via network interface 4. In the invention, multiple compressors 3 are employed to compress the captured image into a plurality of different compressed signals, representing different degrees of image resolution, compression type, or compressed bit rate. These multiple video streams may be combined into one composite stream for network transmission, or may be maintained as separate and distinct video or still frame streams throughout the network.

Note that the digitizer, compressor, and network interface can be integral to a camera housing, or can be housed separately such as in a Video Encoder.

Video or images thus networked may be selectively viewed on an operator's console consisting of PC(s) 6 and monitor(s) 7, or may be received by a networked server 8 for storage, analysis, and subsequent retrieval via disk storage 9 or tape storage 10.

In the disclosed invention, cameras use the popular Ethernet networking protocol. Using the familiar OSI hierarchy, Ethernet is used for the physical layer, and UDP/IP is used for the network and transport layers. Networks ma be wire, fiber or wireless. Other network protocols and topologies may also be utilized.

Latency Reduction

Networked digital video systems as previously described typically suffer greater end-to-end delay (latency) than their analog counterparts. Three factors contribute to this increased delay:

Time required to compress the camera's video,

Transport delays when using typical packet-based data networks, and

Time required in the receiver to buffer and decode the compressed video.

Figure 2:
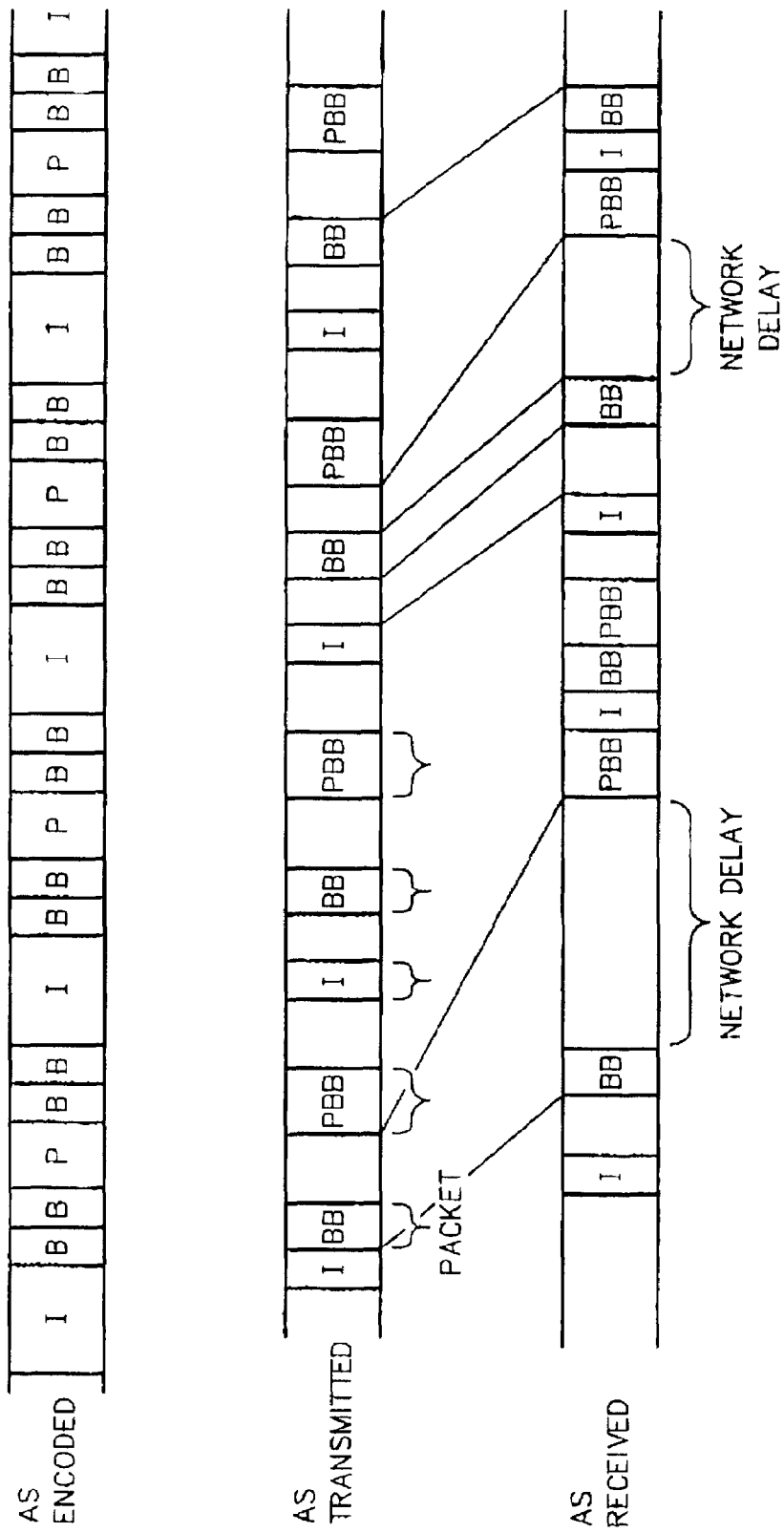
FIG. 2 illustrates the effect network delays have on the arrival time of the video packets at a receiver.

The second factor aggravates the third; the receiver must buffer the incoming video data sufficiently to absorb worst-case delays in the received video. FIG. 2 illustrates the problem.

In FIG. 2, a video stream has been digitized and compressed. Individual frames of the original analog video signal are compressed into three compressed frame types:

'I' frames, which are entirely inter-frame coded

'P' frames, which represent a 'prediction' based on previous I frames, and

'B' frames, which are bi-directionally predicted.

Analog video sources typically produce 30 frames/second. After compression, the 'I' compressed frames are typically large, while the 'P' and 'B' frames are much smaller. Note, however, that the time interval between successive 'I' frames is necessarily an integral multiple of an analog frame time, e.g. 1/30 second. In the example shown, the incoming analog video frames are coded in a sequence 'I B B P B B'. This sequence represents six coded frames of the analog video source, thus represents 6/30 seconds, or 200 milliseconds. In short, the frame rate of these compressed frames remains equal to the frame rate of the original analog source. [Note that other compressed frame sequences may be used as needed, yet the overall compressed frame rate equals the source frame rate.]

When this compressed digital video stream is transmitted into a packet-based communications network, the individual I, P, and B frames may be fragmented and packetized as dictated by the specific networking protocols. For example, common Ethernet packets are limited to a maximum size of 1500 bytes. The resulting Ethernet packets may not be congruent with the original encoded frames. For example, an I frame may be larger than the 1500 byte Ethernet limitation, and may thus span multiple Ethernet packets. Likewise, 'B' frames or 'P' frames may be smaller than the 1500 byte size limit, allowing multiple 'B' or 'P' frames to share an Ethernet packet.

Despite this packetization, the Ethernet packets—as transmitted—are typically well correlated temporally with the original encoded packets. That is, Ethernet packets containing 'I' frames are transmitted at approximately the same rate as they occurred in the original encoded video stream. This is illustrated in FIG. 2. Note that the Ethernet packets are transmitted at the same overall rate as the original encoded frames, although they are delayed slightly due to buffering as part of the transmitter's packetization.

Note also, in FIG. 2, that the amount of time required to actually transmit any given packet is shorter than the original encoded frame. In other words, the network is capable of transmitting the video packets at a faster rate than that at which they were originally encoded. This is obviously necessary in order to transmit the packets—the networking medium must have greater bandwidth capacity than the data it is to convey.

During transport over a packet network, data packets suffer unpredictable and non-constant delays. Network switches and routers receive store, and forward packets according to a complex set of rules, and in accordance with the constantly-changing conditions on the network. For example, the amount of traffic over any particular network span tends to be 'burtsy', and packets may therefore be delayed or even re-routed over an alternate path towards their final destination. As a result, the packet arrival time, at the receiver, is typically non-constant as illustrated in FIG. 2.

FIG. 2 illustrates the effects of these various network delays on the arrival time of the video packets at a receiver. While the encoded and transmitted video data are reasonably coherent in time, the received video data packets are not. This is a serious problem for real-time data streams such as video, since those intermittent and unpredictable network delays might result in a 'gap' or 'dropout' in a received video or audio signal.

Note also, from FIG. 2, that the network delays are non-cumulative. This is due to the fact that the network conveys the packets at a faster rate than they were created. Thus, after a network delay event, it is possible (and likely) that subsequent packets will 'catch-up' with the original arrival schedule. Since these network delay events are non-cumulative, it is possible to mask the effects of these network delay events simply by buffering the received data. For example, if the longest network delay event is one second in duration, then a one-second buffer in the receiver will mask the effects of the network delay.

While effective, this approach adds to the (undesirable) end-to-end delay of the system. In addition, video streams created at different resolutions from the same source tend to experience volume of compressed data than its equivalent 176×112 resolution QSIF stream. Thus, if a camera were producing both streams simultaneously, then a one-second receive buffer would effectively impose more delay on the QSIF stream than on the equivalent SIF stream (since the player takes longer to fill-up the receive buffer with a slow QSIF stream than the faster SIF stream).

Figure 3:
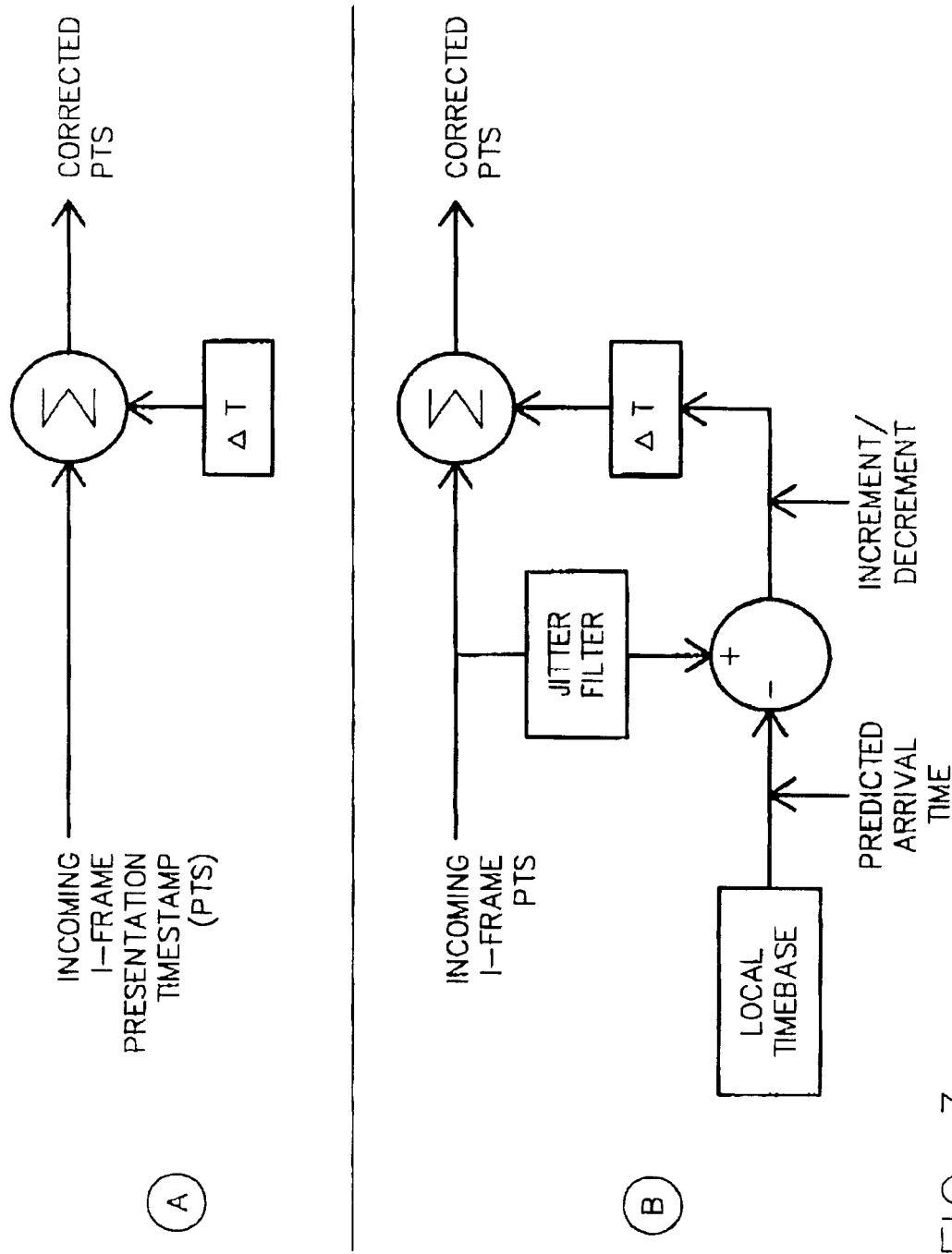
FIG. 3 illustrates the examination of a receiver's incoming packets to find succeeding information frames and the time stamp.

In the invention, a fixed-size receive buffer is not used. Instead, a software-controllable playback timestamp is inserted into the received compressed video stream, effectively establishing an implicit buffer size in the player. FIG. 3 illustrates the method.

In FIG. 3 part A, a receiver's incoming packets are examined to find succeeding I frames, and the Presentation Timestamps (PTS's) are extracted from the I-frame packets. With a prior knowledge of the worst-case network delays, a predetermined value of $\Delta T$ is established. This $\Delta T$ is subsequently added to the received PTS of each frame, and the PTS value in each frame is substituted with the new value. This, in effect, commands the player to delay the playback of each frame by a constant $\Delta T$ amount. The player creates an internal playback buffer of that size, which is sufficiently large to absorb worst-case network delays.

This simplistic approach, while useful, exposes an additional and related problem which must be solved. This problem involves rate-matching between the original analog video source, and the player's timebase. The original source camera contains a clock oscillator, typically a quartz oscillator and divider which produces the various line- and frame-clocks for the camera. For example, ordinary NTSC composite video as used in the United States has a line rate of 15,734,265 Hz and a frame rate of 29.97 Hz. The camera's quartz timebase produces these frequencies, subject of course to small frequency errors due to the crystal's inherent accuracy and to temperature effects.

Likewise, the player, typically a PC running a video player application, contains its own quartz timebase, subject to the same accuracy and temperature effects. Since the video is conveyed over a packet-based network, no reference clocks are available end-to-end which might indicate (to the receiver) the frame rate of the source camera. The player can be commanded to play the incoming video at a nominal 29.97 Hz frame rate, but the player's frame rate won't exactly match the camera's frame rate. As a result, the player will tend to run slightly slower or faster than the original camera, and the player will gradually lag the source or worse, run faster than the source which would eventually deplete the receiver's receive buffer.

In the invention, this rate mismatch is resolved as shown in FIG. 3 part B. As indicated, the player's time base is compared with the timestamp of each received I frame. If the player's timebase matches that of the camera, then the player's timebase will track the PTS timestamp of the received I-frames. (Note that this will be true only after the incoming I-frame PTS data is properly filtered to reduce the effects of random network delay jitter). In the invention, the received PTS are subtracted with predicted PTS, as predicted based on the player's local timebase. The result of this subtraction indicates the presence of relative drift between the respective timebases. Based on the result the $\Delta T$ value is incremented or decremented as necessary to match the respective PTS time rates.

In summary, the invention reduces received video latency and performs end-to-end rate matching by:

Adding an offset to received Presentation Time Stamps (PTS) sufficient to account for worst-case network delays, and Adjusting the size of said offset based on an averaged arrival rate of incoming I-frame data, to account for rate mismatches between transmitter and receiver.

Resolution of Multiple Network Interfaces

Figure 4:
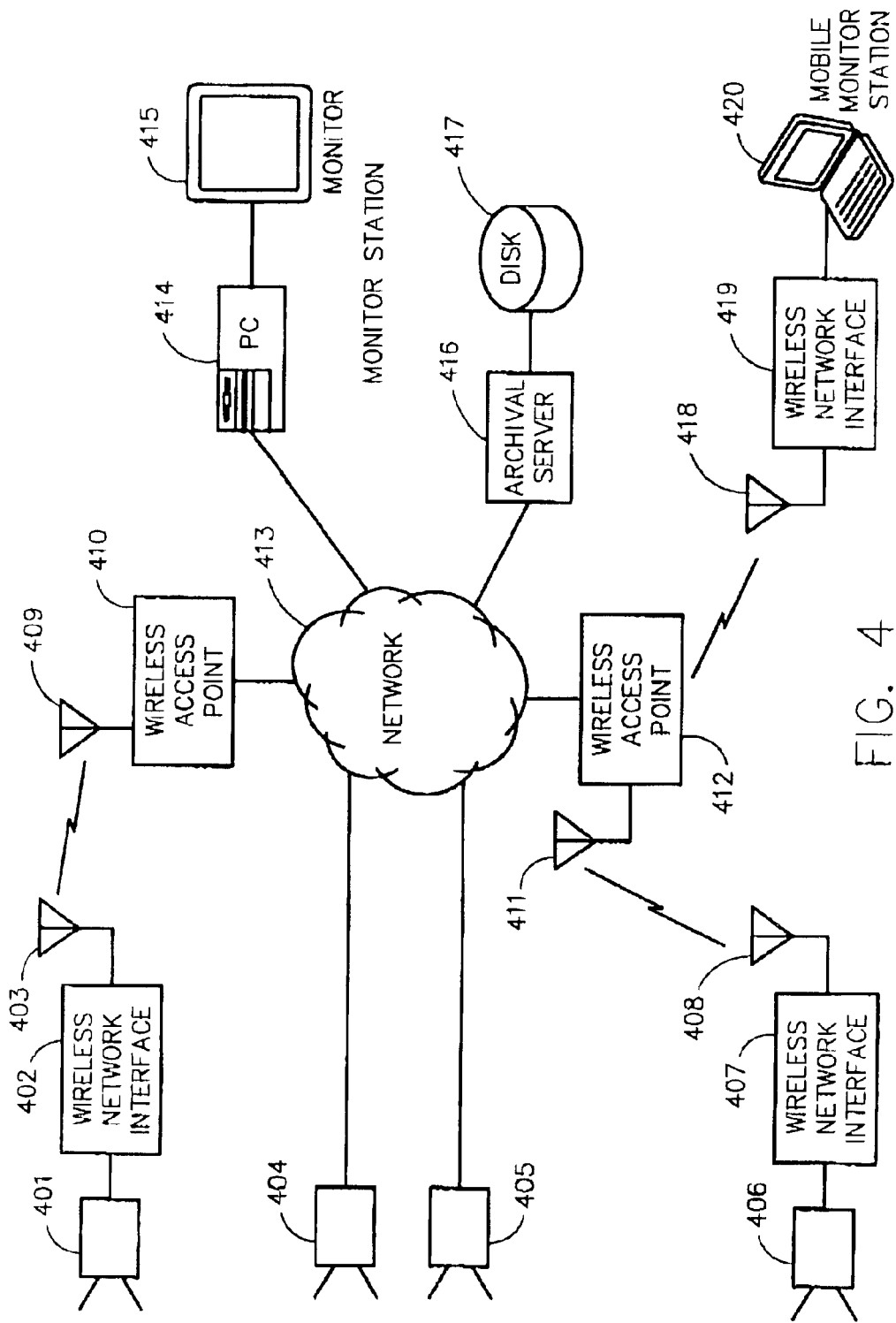
FIG. 4 illustrates the extension of the network to include various wireless devices.

As previously described, the various cameras are connected to an extended network, increasing the utility of the surveillance network. The most popular such network is currently the 1'0/100 M-Bit Ethernet network. In such a network, devices are connected to network hubs, switches, or routers via twisted-pair cables. While useful, it is often desirable to allow cameras or monitor stations to be connected to the network using a wireless networking topology, such as the IEEE 802.11 'Wireless Ethernet' standard. FIG. 4 illustrates the topology.

In FIG. 4, surveillance network 413 accepts and conveys compressed digital video streams from hardwired cameras 404 and 405. Said video is conveyed to a hardwired monitor station comprising PC 414 and monitor 415. The video may additionally be conveyed to archival server 416 and associated disk storage 417. These parts of the surveillance network accord with the network of FIG. 1, and indeed with the network described in previous disclosures.

FIG. 4 depicts the extension of the network to include various wireless devices. For example, camera 4301 uses a wireless Network Interface 402, which transmits the compressed digital video stream via antenna 403 and 409 to a distant Wireless Access Point 410. This access point receives the wireless data transmissions from Network Interface 402, and forwards the transmitted data into network 413 in the form of ordinary 10/100 Mbit Ethernet. Camera 406 does the same, transmitting it's video via Network Interface 407, antennas 408 and 411, to Access Point 412, and the Network 413. These cameras may thus be located at a remote site where hardwired connections would be impossible, or indeed may be fully mobile 'roving' security cameras.

FIG. 4 likewise illustrates that the monitoring stations may be connected to the network using a wireless network connection. Monitor station 420 connects to the network via wireless Network Interface 41 and antenna 418, to wireless Access Point 412. As before, this monitor station may be in a remote location where hardwired connections would be impossible, or may be a mobile 'roving' monitor station. Note that the actual mobile device used to implement the Guard Station may be a small pocket-sized PC, or a PDA, or the like. Note also that the monitor station's Wireless Network Interface 419 will typically be an internal device within the monitor station, often implemented in a PCMCIA or Cardbus package.

Figure 5:
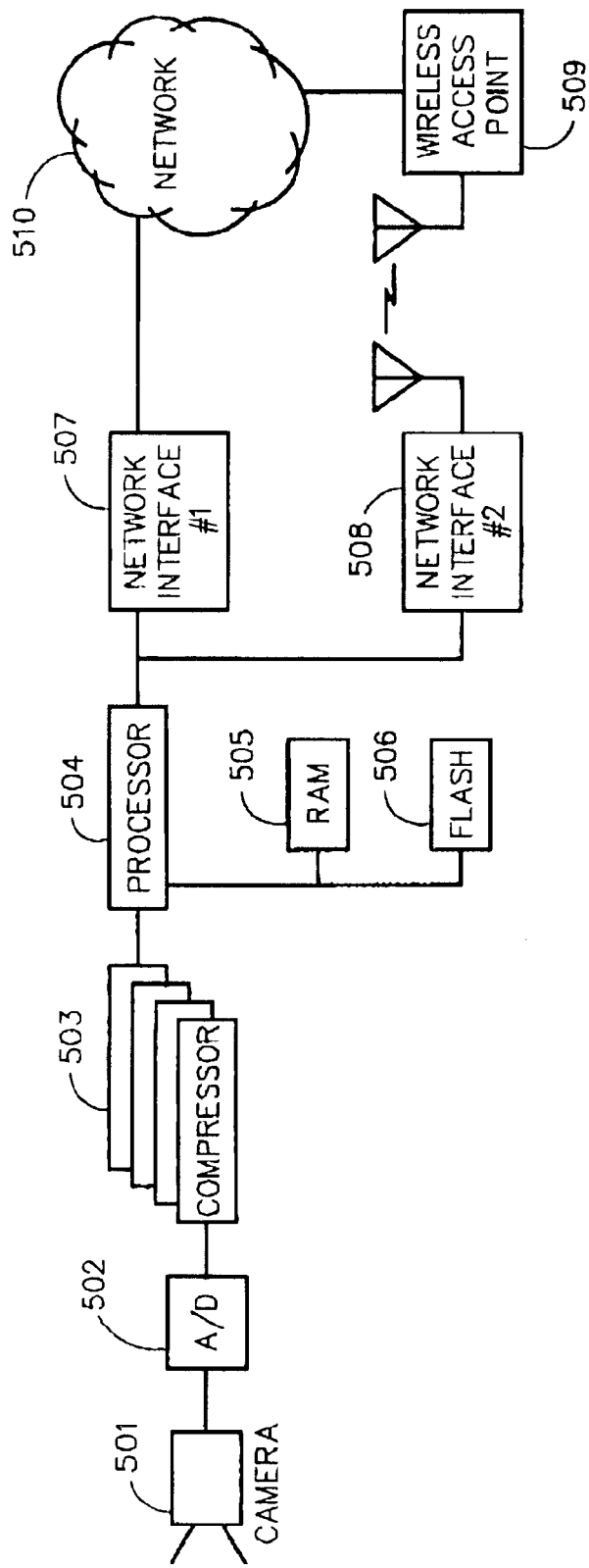
FIG. 5 is a detailed illustration of the wireless camera configuration.

FIG. 5 illustrates the Wireless Camera in greater functional detail. Inside the wireless camera, camera module 501 captures a scene of interest and produces a corresponding analog video signal. This signal is digitized by A/D converter 502, and compressed by compressor 503. The Wireless Camera may preferably employ more than one compressor, thus enabling the Wireless Camera to produce several simultaneous compressed video streams with different bandwidths or with different types of compression. These compressed digital video streams are subsequently processed y processor 504, which packetizes the various video streams for network transport.

In the invention, the Wireless Camera is equipped with more than one Network Interface. As depicted, the Wireless Camera is equipped with one wired network interface 507, and with one wireless network interface 508. Other configurations are possible, for example both network connections might be wireless without materially departing from the scope of the invention. The availability of multiple network connections enhances the utility of the camera in two respects:

The second network interface may be used as a backup, in case the primary network connection is disabled or otherwise compromised, and The second network connection may be used as a 'diagnostic' network connection, allowing network access to the camera for configuration or for troubleshooting.

Figure 6:
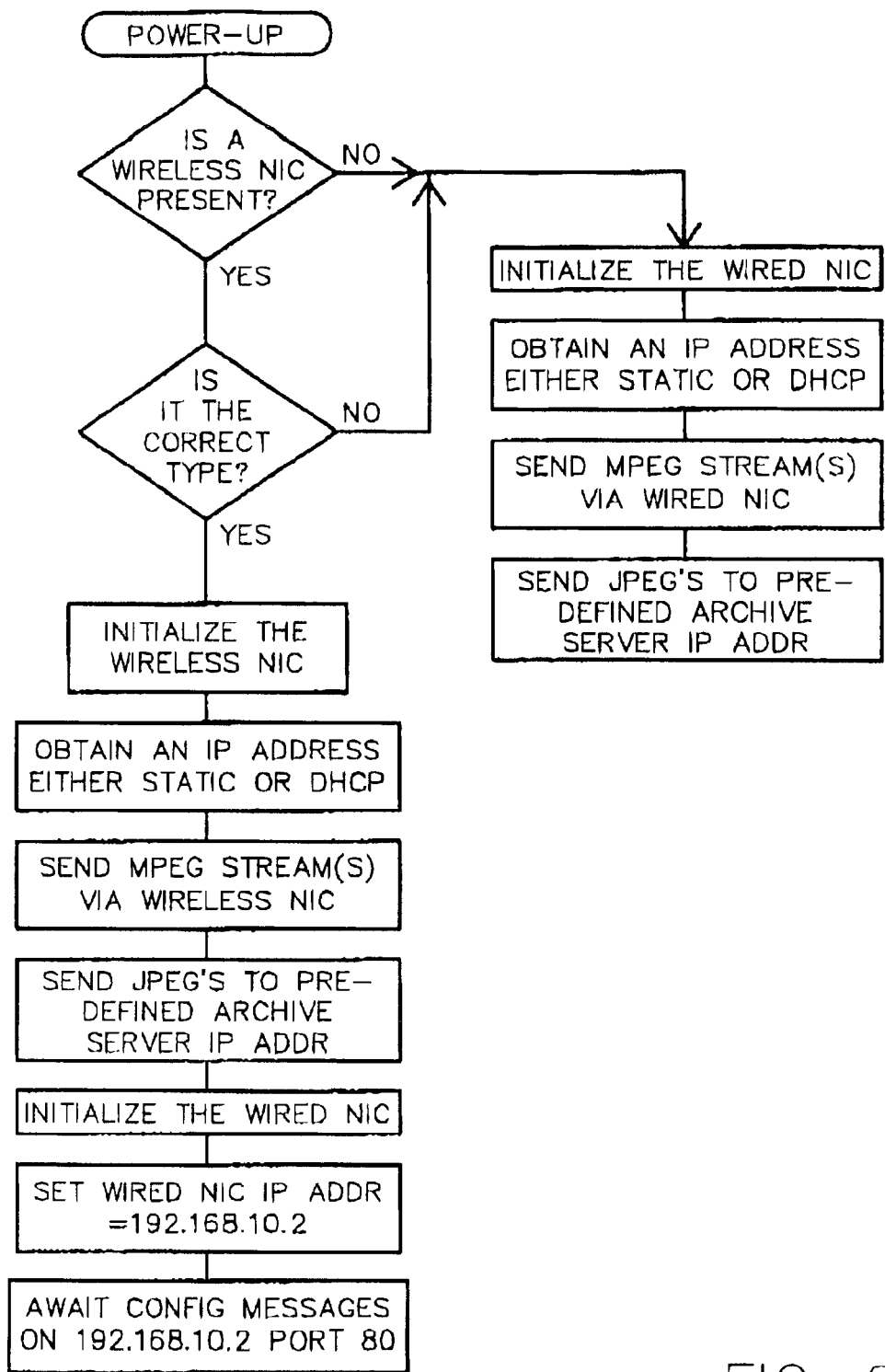
FIG. 6 shows a camera containing one wired network interface and one wireless network interface.

During power-up, it is necessary for the camera's internal firmware to determine the appropriate camera configuration, based on the types and availability of installed (or functional) network connections. FIG. 6 illustrates the algorithm used in the invention, to determine the camera's network interface configuration.

FIG. 6 deals with the case of a camera containing one wired network interface (NIC) and one wireless NIC. The wireless NIC is preferably used if available, and the wired NIC thereupon defaults to being a simple diagnostic port. As shown, upon power-up the camera firmware first determines whether a Wireless NIC is installed. In actual practice, such Wireless NIC's are typically housed in a PCMCIA form factor, and the usual PCMCIA card detects signals #CD1 and #CD2 may be used to determine if any PCMCIA card is installed. If a card is indeed detected, the camera firmware proceeds to read the card's tuples, and verify that the installed PMCIA card is indeed the correct type.

In the case where no card is installed, or when an unrecognized wireless NIC card is detected, the firmware proceeds to use the wired Network Interface as the primary network interface The firmware proceeds to initialize the wired NIC, and obtains a valid IP address for it either using DHCP or by using a pre-defined static IP address. The camera then proceeds to send MPEG video stream(s) to the network, and sends JPEG images to an archival server at a predetermined IP address.

In the case where the firmware detects a Wireless NIC of a compatible type, the firmware initializes the wireless NIC, and obtains a valid IP address for it using either DHCP or a predefined static IP address. The firmware then begins sending the MPEG stream(s) to the network, and sends the JPEG images to the predefined archival server. In addition, the firmware initializes the wired NIC, and assigns it a 'safe' IP address such as 192.168.1.0.2. Such an IP address belongs to a category of 'Safe' IP addresses, which are guaranteed not to be routed by any network routers. The firmware listens on this NIC, on port 80, for any configuration or diagnostic messages that may appear. In this way, the wired network connection may be used for camera configuration or diagnostics, without disturbing the Wireless network connection.

In summary, the invention allows a network device to contain two separate Network Interfaces, and provides a means to resolve the function of each.

Panic Button

Previous disclosures have described a system in which a wireless 'panic button' may be carried by personnel to be used in emergency situations. When pressed, the panic button emits an RF or other signal to one or more networked receivers. Upon detection of such a signal, the networked receiver (s) take appropriate actions such as alerting appropriate response personnel, enabling cameras covering the location of the event, and enabling the recording of video still-frame images, and audio associated with the event. The prior disclosure dealt primarily with the devices which transmit and which receive these signals. The present invention deals primarily with the variety of actions, taken by the various networked devices, to such an event.

Figure 7:
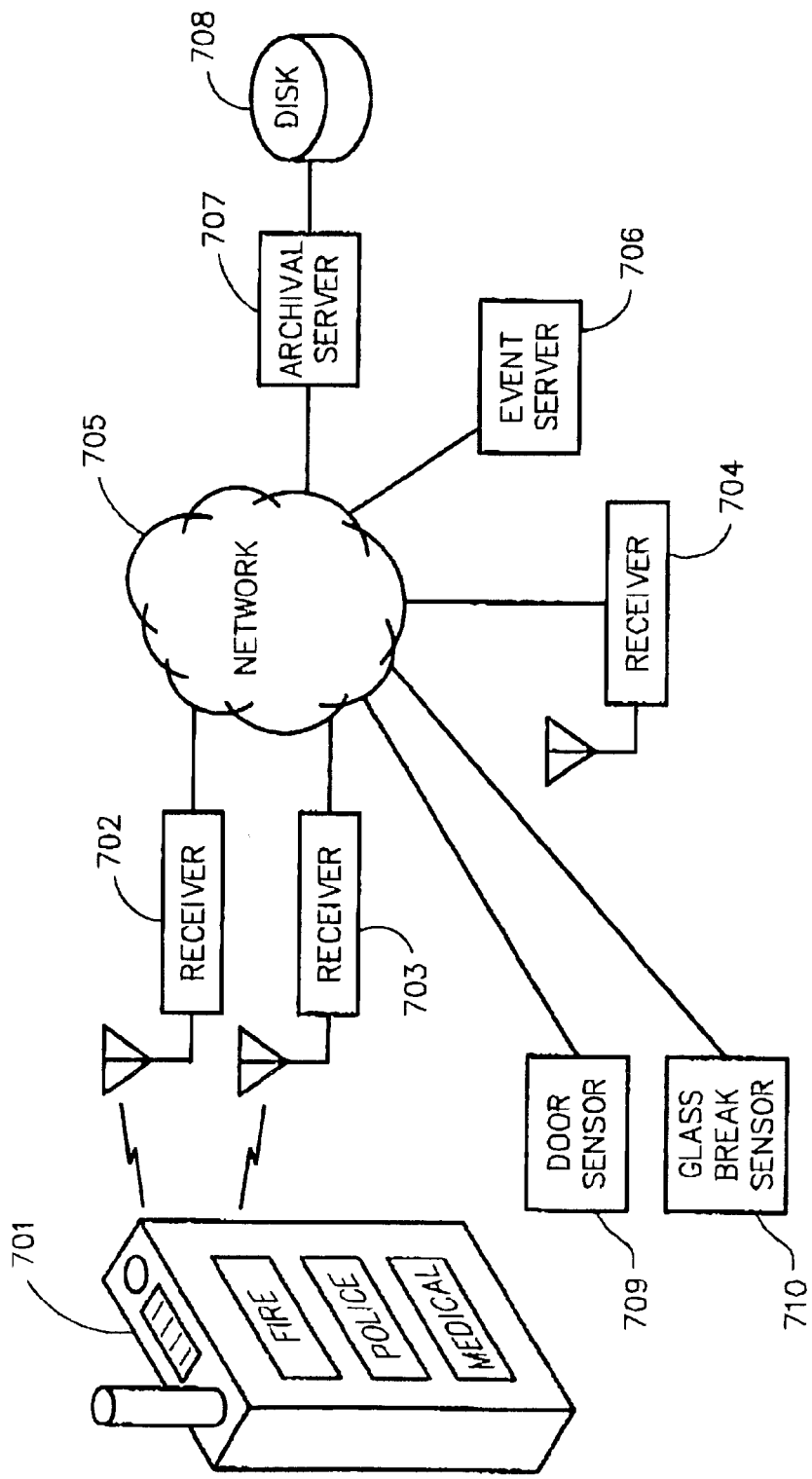
FIG. 7 shows a system incorporating a wireless panic button PDA.

FIG. 7 depicts a simple implementation. A wireless panic button transmitter 701 contains several buttons, each representing a different type of emergency. For example, one button may indicate 'FIRE', and other buttons may represent 'POLICE', 'MEDICAL', and so on. When a button is pressed, the device transmits a signal representing which button was pressed. One or more networked receivers 702 through 704 receive and decode the signal, and alert an Event Server 706 that the emergency signal has been received.

Figure 8:
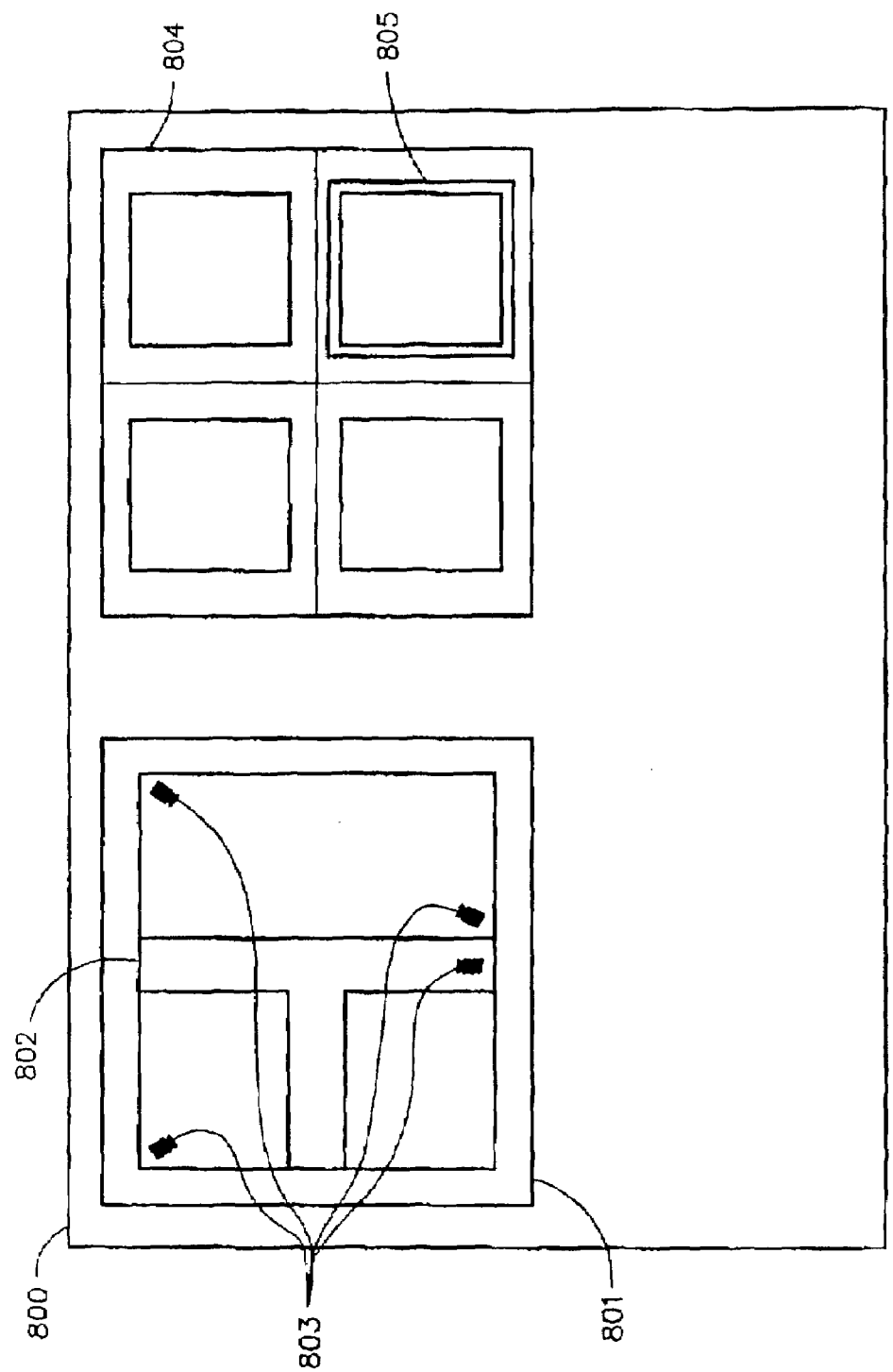
FIG. 8 depicts the layout of a typical monitor screen.

FIG. 8 depicts the layout of a Monitor Station screen. As described in previous disclosures, the monitor station screen 800 contains a Map Pane 801, which contains a map 802 of the facility currently under surveillance. Icons 803 depict the locations of available cameras within the facility, and are stylized to indicate the direction that the camera is currently pointed. Camera view pane 804 displays the current real-time video from one or more selected cameras. As shown, the screen is configured to simultaneously display the video from four different cameras.

When the networked Event Server receives notice that one or more panic button receivers have detected a panic button signal, the Event Server causes the monitor station to take several actions:

The video from the appropriate cameras is automatically displayed in view pane 804. One or more cameras may be displayed, and the selection of which camera to be displayed is predetermined based on which cameras are physically near the panic button receiver which received the emergency signal.

Video images thus displayed are surrounded by a colored blinking border 805 so as to become visually distinct from other displayed video.

The affected camera's map icon 803 is also made to blink, and to assume the same distinct color as the corresponding view pane's blinking border 805.

The distinct color used in the view pane border 805 and in the blinking icon 803 are chosen to represent the nature of the emergency signal received, for example, red for FIRE, blue for POLICE, green for MEDICAL, and so on.

The Event Server instructs the networked archive server, item 707 in FIG. 7 to begin recording all motion video, still-frame images, and audio from cameras which have been preconfigured to be associated with the emergency signal.

Figure 9:
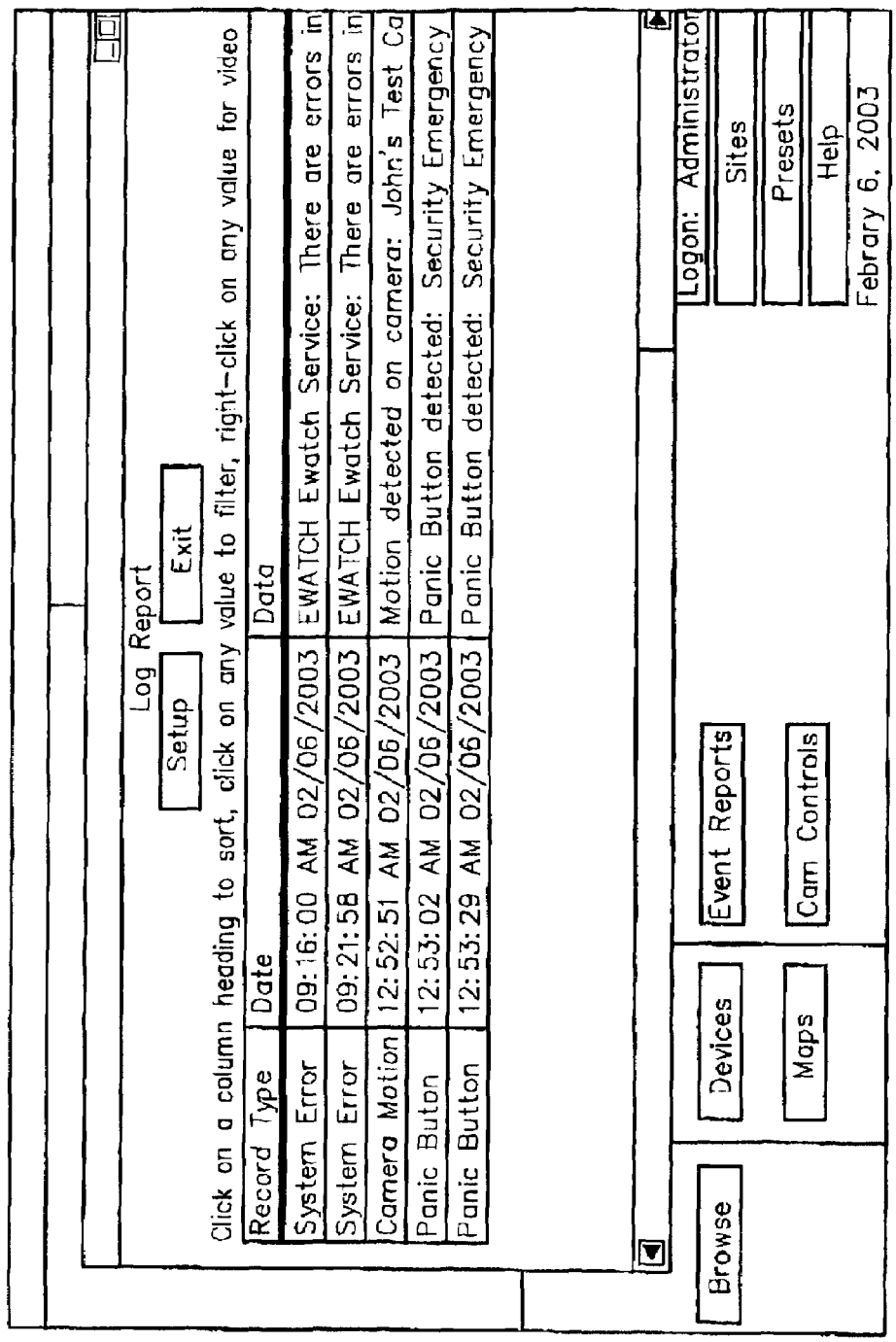
FIG. 9 illustrates a typical event database report.

The Event Server may additionally receive status data from a variety of other sensors attached to the network, as illustrated again in FIG. 7. Door sensor 709 and Glass Break sensor 710 are equipped with appropriate embedded network interfaces, and attached to network 705 as are receivers 702, 703, and 704. Event server 7067 receives status data from these and other similar network-based sensors. The Event server thereupon records said status data in an Event Database, along with other system status. This other data includes emergency signals received by one of the various receivers, motion-detection events in one of the networked cameras internal error conditions detected by the Event Server or Archive Server, and so on. The Event Server database thus contains a continuous record of all notable system events. FIG. 9 illustrates a typical Event Database report. As shown, the Event Database, during the requested time interval, detected and recorded five separate notable events: Two system errors, one camera motion event, and two emergency signals from a Panic Button transmitter.

In summary, the invention provides a means to integrate a wireless 'Panic Button' device into the networked security surveillance system.

Improved Joystick Interface

Previous disclosures have described the use of movable cameras on the digital surveillance network, cameras that may be controlled via mouse or joystick to point to any commanded pan or tilt position. Such joystick control of cameras is commonplace today. Most often, the camera is mounted on a motorized camera mount, and the joystick simply activates a motor to pan the camera, or to tilt the camera. User inputs thus amount to "left-right" or "up-down" commands to the camera.

Newer pan/tilt camera mounts are more sophisticated. In these newer pan/tilt camera mounts, control inputs take the form of communications messages which pass commands and parameters to the camera's motor controller. With these newer mounts, the camera can be commanded to move to a specific X, Y position, or to zoom to a specific Zoom setting, and so on. These newer, more intelligent camera mounts make it possible to improve the behavior of the pan/tilt user interface.

When using simple 'left-right' and up-down control inputs, it is often difficult to achieve precise camera positioning. For example, if a small item within a scene of interest is not well centered within the scene, it is often difficult to make the small movements necessary to center the item of interest. Likewise, if the item of interest is an object in motion, it may be maddeningly difficult to follow the roving item using these simple control inputs.

In the present invention, a newer operational mode is introduced which allows easier and more precise control of the camera. This newer operational mode requires no additional system hardware, since it is implemented as an algorithm operating within a monitor station.

Figure 10:
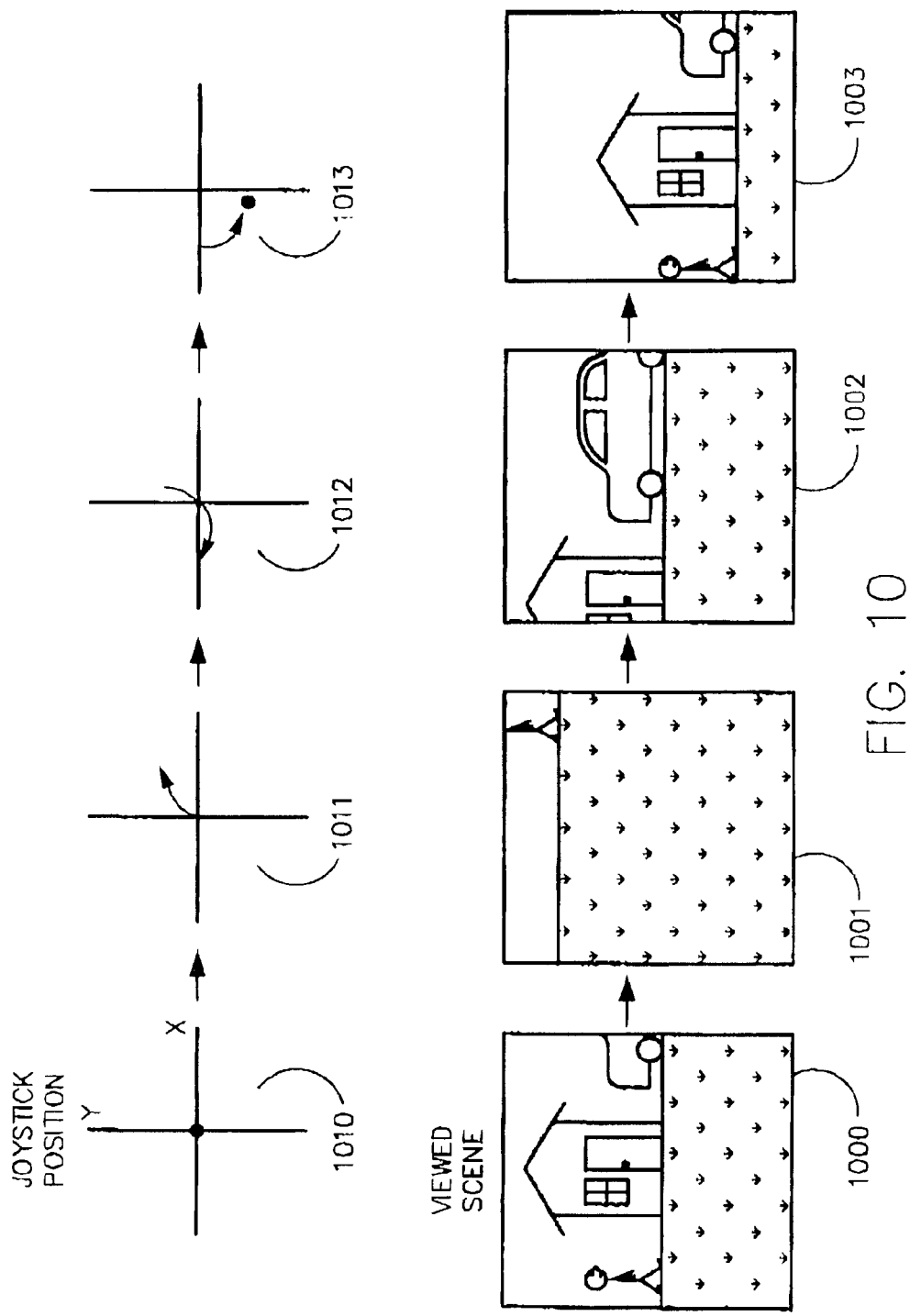
FIG. 10 shows the use of a joystick to control pan/tilt/zoom using a dot on the monitor screen.

In this new operation mode, the user first positions the camera to approximately the desired scene. The user then presses a convenient button, such as the trigger button on the joystick, to enter the new mode. In this so-called 'drag mode', the camera's present X, Y position is taken as a reference, and the camera is continuously commanded to move to an offset position determined by the X, Y displacement of the joystick from it's center position. In effect, as long as the user continues to squeeze the trigger button, the user is able to effectively slide or drag the viewed scene with the joystick. FIG. 10 illustrates the idea.

In FIG. 10, the joystick's current position is indicated by the dot within position indicator 1010. The scene currently viewed is represented by scene depiction 1000. When the user squeezes the joystick's button, the monitoring station's joystick data processing algorithm sends a position inquiry message to the intelligent pan/tilt mount, and obtains the pan/tilt mount's current X, Y position. This value is thereupon used as a reference position, X0, Y0.

While continuing to hold the joystick's trigger button, the user moves the joystick to the position indicated in 1011. The joystick data processing algorithm continuously notes the joystick's positional offset from the joystick's effective origin, calculates the desired new camera position X1, Y1, and sends regularly-timed position commands to the camera's pan/tilt mount. In effect, the camera's pan/tilt mount continuously tracks the position of the joystick. When the user has the joystick positioned as shown in 1011, the camera has been commanded to move to an analogous position, resulting in scene 1001. When the user moves the joystick to position 1012, the pan/tilt mount becomes displaced by an analogous amount, again resulting in a new scene 1002.

Note that the offset positions sent to the camera are, in fact, opposite in direction from the joystick inputs. This provides the operator with a sense of moving the scene, rather than a sense of moving the camera. Thus, when in 1011 the user has commanded that the scene should be displaced to the upper right, the camera is commanded to an offset position to the lower left. The user thus has a sense of moving the scene to a desired spot, rather than a sense of moving the camera.

The calculation of position offset must account for the cameras current zoom setting. For example, if the camera is zoomed in tightly onto a distant object, then the user's control inputs must be scaled (in this case reduced) proportionally to the current zoom setting.

In summary, the invention creates a new user interface means for controlling the aim position of a remote camera, wherein the user's control device appears to drag the viewed image, resulting in improved ease-of-use.

Improved Pan/Tilt Response Times

As previously described, compressed digital video networks exhibit some degree of latency, or end-to-end delay. This delay is dependent on several factors including the resolution of the source video, the complexity of the encoding algorithm, data transit delays in the transmission network, buffering in both the transmitter and receiver, and the time required in the receiver to decompress and display the data. Typical values for this end-to-end delay are typically in the hundreds of milliseconds, up to several seconds.

This end-to-end system delay becomes a problem when a user is trying to effect real-time control of a remote pan/tilt camera, especially when attempting to track a moving object. Any scene viewed by the user has, in fact, occurred in the past. To track a moving object, the user must predict the future position of the object in order to follow it. This delay may be exacerbated by any network delays in delivering camera position commands to the remote pan/tilt camera mount.

End-to-end video latency may be reduced to a few hundred milliseconds by reducing the size of the receive buffer, and assuming that the network is lightly loaded and exhibits little jitter. It is imperative, therefore, that camera position control commands do not suffer any appreciable network delays.

In previous implementations, the monitor station communicated with the remote camera by opening a socket connection to the remote camera, sending the position command, then closing the socket. This can be a time-consuming process, easily adding up to several hundred milliseconds. In addition, it is a desirable feature of the network that other viewers of a given pan/tilt camera should be able to see real-time data describing the camera's current position.

Figure 11:
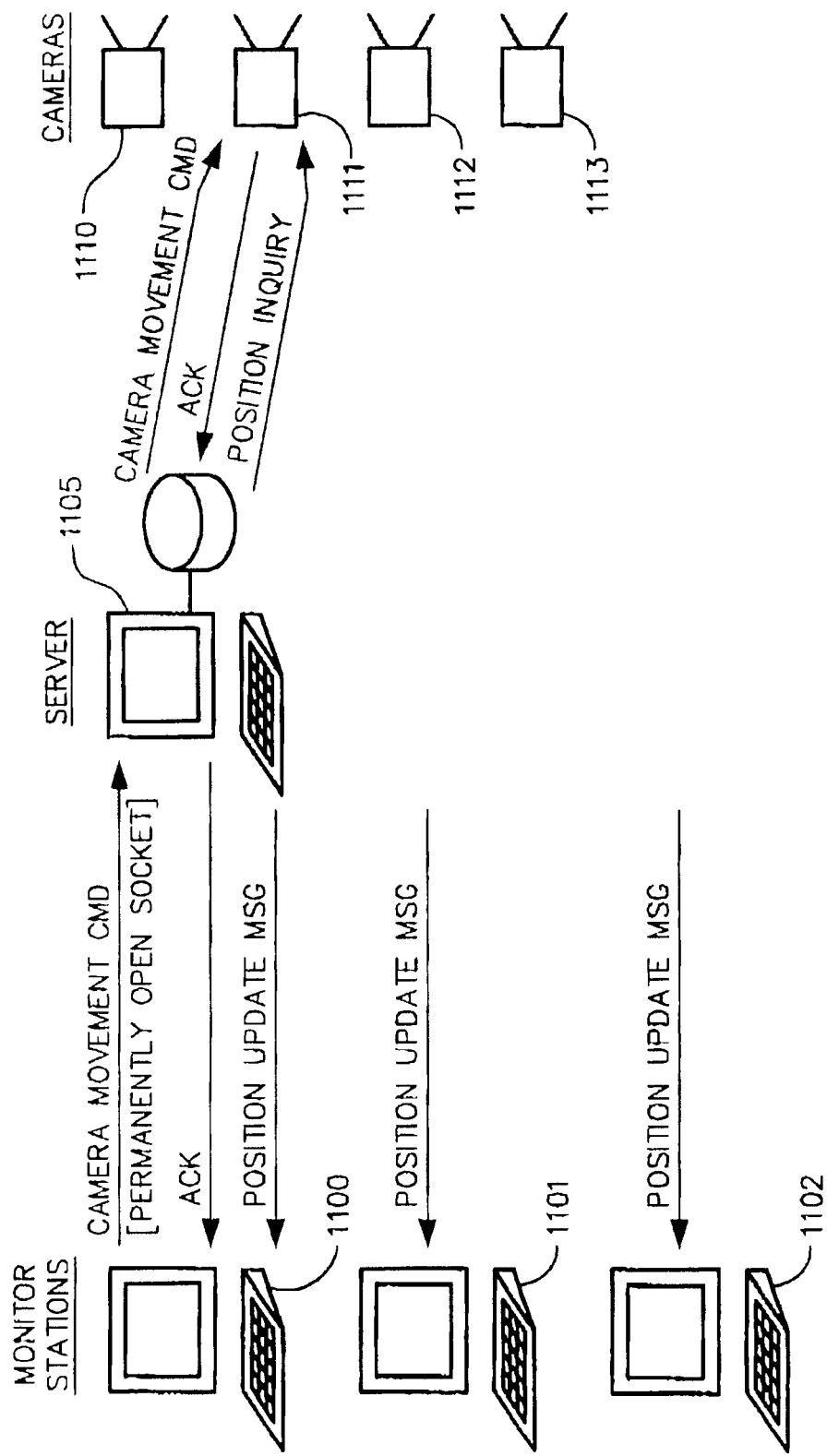
FIG. 11 shows a plurality of monitor stations, each with a permanently open socket connection to the server.
Figure 12:
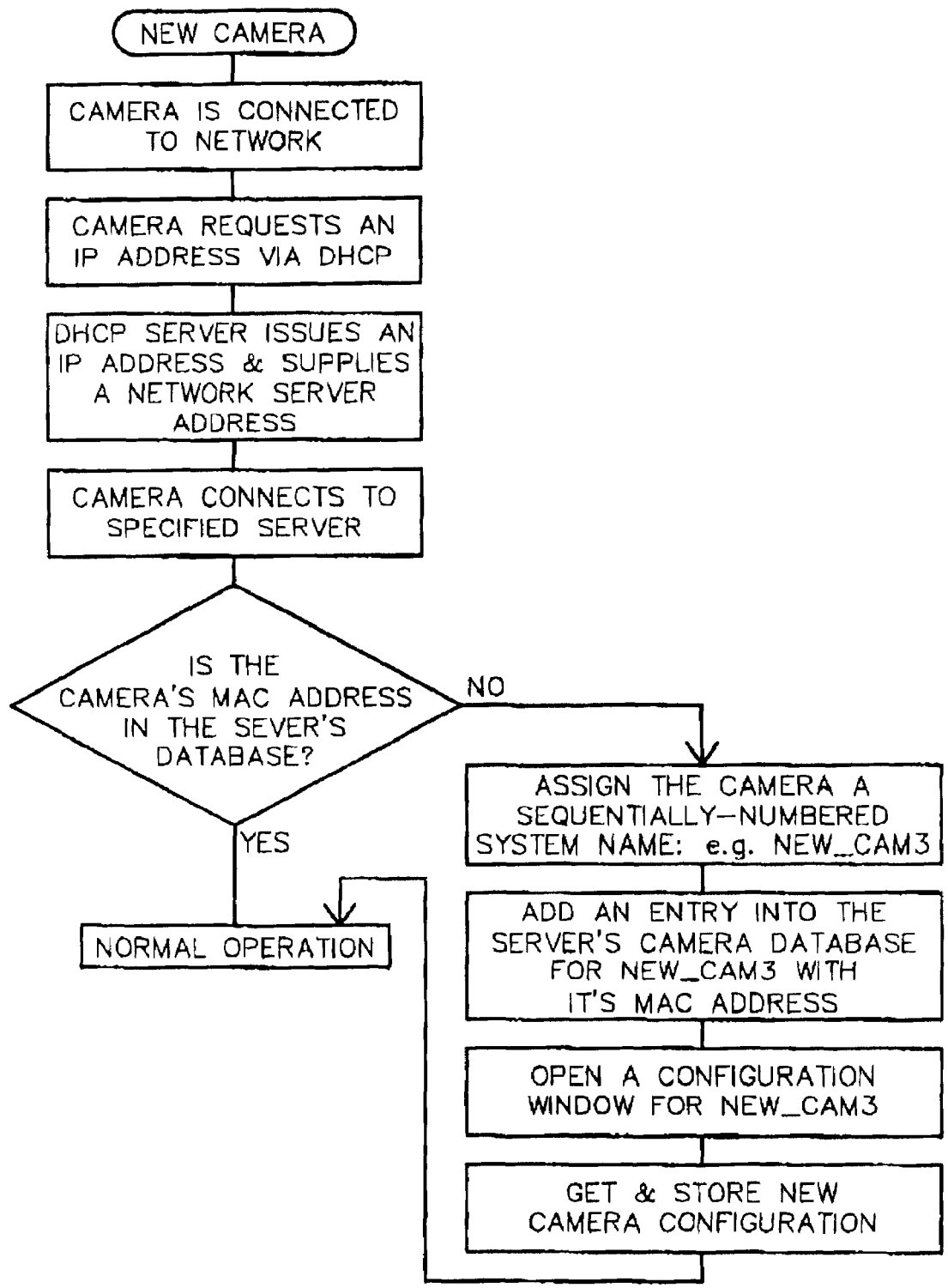
FIG. 12 is an operational flow chart.

In the invention, these requirements are satisfied via a novel system for communicating and disseminating camera commands and real-time status, using common client-server techniques. FIG. 11 depicts the method used.

In FIG. 11, each monitor station 1100, 1101, and 1102 maintains a permanently-open socket connection to Server 1105. Likewise, the Server maintains a separate, permanently-open socket connection to each camera 1110 through 1113. When Monitor Station 1100 wishes to control camera 1111, it sends appropriate command messages to Server 1105 over the open socket connection. Server 1105 immediately forwards said command messages to camera 1111 via the open socket connection. Since the communications stay permanently open, no time is expended in the process of opening up a new connection, thus reducing the camera command latency time.

Moreover, Server 1105 obtains real-time position status data from the camera being controlled. This status data may be received either in response to a specific inquiry, or may be generated by the camera as part of the command acknowledgement protocol. In either case, this camera position status is received by Server 1105 over the open socket connection. Server 1105 immediately forwards this updated camera position status data to all monitor stations on the network, not simply to the monitor station currently controlling the camera. This allows all monitor stations on the network to maintain a cache of the current, real-time status of all such cameras on the network. Each monitor station may, therefore, maintain a real-time display of the camera position.

Other benefits arise from this architecture. First, when a monitor station switches to a new camera for viewing, the position status information for that camera is already available to the monitor station. Hence, the monitor station may provide an immediate display of camera position status, rather than having to send an enquiry and waiting for the response to arrive. Second, this approach may be used for other camera functions besides simply camera movement controls. All other camera status and configuration functions may be executed quickly, and the results displayed immediately on all monitor stations viewing that camera. These configuration and/or status functions include alarm conditions, zoom settings, status of motion detection, brightness, contrast, and various other camera configuration parameters.

In summary, the invention provides a means for reducing lag times associated with a remote controlled-camera, and provides a means for all viewers of said camera to receive instantaneous data updates concerning the camera's position & other status data.

1. OVERVIEW e-Watch Site Watch is a network-based digital surveillance and monitoring system. The system operates on digitized video streams created by video encoders that are strategically located and connected to the network. The encoders may be integrated into digital video cameras or may be externally connected to legacy analog cameras. In this document, the term "camera" refers to a digital encoder and camera, whether integrated or externally connected. The digitized streams are routed through the network using the Internet Protocol (IP).

The e-Watch Server is a computer running the e-Watch Service application. e-Watch Servers control the routing of the digitized video streams over the IP network. In addition, e-Watch Servers receive and store the digitized videostreams.

The e-Watch WatchStation™ is a computer running e-Watch windows 2000 Pro, 1E5.5 and the e-Watch video filter program. The digitized video streams are routed over the IP network to WatchStations. The streams are decoded and made available for viewing in real time. In addition, WatchStations can retrieve and playback video streams that have been stored on an e-Watch Server.

All software components and configuration data are stored on the e-Watch Server and made available to WatchStations as needed at runtime, with the exception of the video filter program which is installed on the WatchStation.

e-Watch supports routing the digitized video streams over wireless network segments. The e-Watch WatchBook™ is a specialized WatchStation that is specifically designed for wireless portability.

This document describes the product requirements of the software operating on the e-Watch Server, the e-Watch WatchStation and the e-Watch WatchBook.

2. REFERENCES 2.1. e-Watch Version 1 PRS (PRS-0038-002)
2.2. e-Watch Version 2 PRS (PRS-0029-001)
2.3. e-Watch Version 2.3 PRS (PRS-0051-001)
2.4. e-Watch Version 2.4 FRD

3. HARDWARE REQUIREMENTS 3.1. e-Watch Server 3.1.1. Hardware
   3.1.1.1. 1 GHz Pentium class processor w/256 kb L2 cache
   3.1.1.2. 512 MB of Memory
   3.1.1.3. 160 GB Hard Drive or higher recommended
   3.1.1.4. AGP Video Controller w132 Mb of Video RAM—not shared system RAM
   3.1.1.5. 101100 Mb Ethernet Network Interface Card
   3.1.1.6. Serial/PS/2/USB Two Button Mouse 3.1.1.7. SVGA Video Monitor
3.1.2. Software
   3.1.2.1. Microsoft Windows 2000 Server, Service Pack 2 or higher
   3.1.2.2. Microsoft Internet Explorer 6.0 or higher
   3.1.2.3. Microsoft Media Player 6.4 or higher
   3.1.2.4. Microsoft JET 4.0 SP3 or higher
   3.1.2.5. Microsoft Java VM Build 3805 or higher
   3.1.2.6. Standard TFTP Server, optional for upgrading camera firmware from the e-Watch Server
3.2. e-Watch WatchStation
3.2.1. Hardware
   3.2.1.1. 1 GHz Pentium class processor w/256 kb L2 cache
   3.2.1.2. 256 MB of Memory
   3.2.1.3. 5 GB Hard Drive minimum
   3.2.1.4. AGP Video Controller w/32 Mb of Video RAM-not shared system RAM
   3.2.1.5. 10/100 Mb p/S Ethernet Network Interface Card
   3.2.1.6. SoundBlaster 16 Audio Card or equivalent
   3.2.1.7. Serial/PS/2/USB Two Button Mouse
   3.2.1.8. Video Monitor capable of 1024×768 pixels at 24 bit color
3.2.2. Software
   3.2.2.1. Microsoft Windows 2000 Professional, Service Pack 2 or higher
   3.2.2.2. Microsoft Internet Explorer 6.0 or higher
   3.2.2.3. Microsoft Media Player 6.4 or higher
3.3. e-Watch WatchBook
3.3.1. Hardware
   3.3.1.1. Sony VAIO C1 PictureBook
   3.3.1.2. Wireless Ethernet Network Interface Card
3.3.2. Software
   3.3.2.1. Microsoft Windows 2000 SP2, or Microsoft Windows Me
   3.3.2.2. Microsoft Internet Explorer 6.0 or higher
   3.3.2.3. Microsoft Media Player 6.4 or higher

4. e-WATCH CAMERA FIRMWARE 4.1. This version of the e-Watch software is backwards compatible to e-Watch Encoder firmware version 2.0.0.11
4.2. Firmware required to support all version 2.4 features will be the released build of e-Watch encoder firmware version 2.2.0.x.
4.3. The camera firmware shall be included on the release media.
4.4. Multicast addresses shall be chosen so that the low bandwidth video stream and the high bandwidth video stream are in different multicast groups

5. e-WATCH SOFTWARE INSTALLER/UNINSTALLER 5.1. The e-Watch release medium shall contain an installer for these components:
   5.1.1. Server software
   5.1.2. WatchStation software
   5.1.3. Gate Watch software
5.2. The e-Watch release medium shall contain an uninstaller for these components:
   5.2.1. Server software
5.3. The e-Watch release medium shall contain sample maps for:
   5.3.1. Office
   5.3.2. School
   5.3.3. Airport
   5.3.4. Airplane
5.4. The e-Watch installer shall be able to detect and upgrade an existing e-Watch installation of Version 2.3a or higher without loss of user data.
5.5. The e-Watch installer shall create a folder on the e-Watch Server under Start/programs for the various e-Watch executables.

6. e-WATCH SERVER

The e-Watch Server software includes the following components:
6.1. e-Watch Service—Starts and manages all background processes required for operation of the Watch system.
   6.1.1. The e-Watch server shall display error dialogs on the server console when severe service errors are encountered. A missing hardware key is one example of a severe service error.
   6.1.2. The e-Watch server shall display error dialogs on the server console when severe service errors are encountered. A missing hardware key is one example of a severe service error.
   6.1.3. No other interaction with the e-Watch Service shall be necessary or possible.
6.2. e-Watch Server Application—Provides basic e-Watch Server inquiry and configuration functions. The e-Watch Server Application includes the following components.
   6.2.1. Registry—allows updating e-Watch configuration data stored in the host operating system's registry.
   6.2.2. Tapes—displays the following data for each tape in the tape database. The tape can be a standalone tape drive or a Compaq SSL2020 tape library.
      6.2.2.1. Provides display of the following data for each tape in the tape database:
         6.2.2.1.1. Tape volume name
         6.2.2.1.2. Tape device slot in a Compaq SSL2020 tape library.
      6.2.2.2. Provides an "Allow Edit" checkbox.
         6.2.2.2.1. The tape data cannot be edited with the "Allow Edit" box is cleared.
         6.2.2.2.2. The tape data cannot be edited when the "Allow Edit" box is checked.
   6.2.3. Images—displays the following data for each tape backup image; no updates are possible to these data.
      6.2.3.1. Date
      6.2.3.2. Sequence number
      6.2.3.3. Tape volume name 6.2.3.4. Tape start position
6.2.3.5. Tape end position
6.2.3.6. Number of minutes recorded
6.2.4. Tape Utilities—provides the following tape functions;
  6.2.4.1. Load—if available in a Compaq SSL2020 tape library, loads a tape from the storage device into the drive
  6.2.4.2. Unload—if available in a Compaq SSL2020 tape library, unloads a tape from the drive into the storage device
  6.2.4.3. Examine tape—displays a tape volume name
  6.2.4.4. Format tape—writes volume name and format information to a tape
6.2.5. Backup—allows creating custom backup tapes for special archive requirements, and restoring data from customized backup tapes to disk. The following options may be selected when creating a custom backup tape:
  6.2.5.1. Start date and time
  6.2.5.2. End date and time
  6.2.5.3. One or more cameras
6.3. Image Delete Utility—Provides a way to manually delete images stored on an e-Watch Server. The following options are made available:
  6.3.1. Delete all images
  6.3.2. Delete images stored prior to a selected date and time
6.4. Encoder Firmware Download Utility—Provides a way to cause e-Watch encoders to download firmware. One or more encoders can be selected.
6.5. DHCP Utility—Provides Dynamic Host Configuration Protocol (DHCP) service Personal Surveillance Kits. This requirement if for Asks only.
  6.5.1. The DHCP Utility will operate only if the host IP address is 192.168.10.1, to ensure that it cannot interfere with other DHCP services.
  6.5.2. The DHCP utility will conform to RFC 2131.
  6.5.3. The DHCP Utility accepts IP address lease requests, and issues DHCP lease offers for IP addresses in its address lease ranges
  6.5.4. Setup parameters:
    6.5.4.1. Local subnet (display only)
    6.5.4.2. Three IP address lease ranges
    6.5.4.3. e-Watch server address
    6.5.4.3.1. Local host option
    6.5.4.3.2. Static address option
    6.5.4.4. Start automatically option
  6.5.5. Static leases—The static lease IP address will be offered only to, and only to, the static lease hardware address
  6.5.6. Active leases
    6.5.6.1. Displays current active leases
    6.5.6.2. Offers the option to copy an active lease to the list of static leases
6.6. Verify Image Utility—Verifies that a selected image file was created by an e-Watch system, and that it has not been altered.
6.7. Hardware Key Serial Number Inquiry Utility—Verifies the presence of a hardware key, and displays the hardware key serial number.
6.8. Camera Flash Program—Provides a way to flash the Model Code in encoder firmware. One or more encoders can be selected.
6.9. IP Broadcast Configuration Program—Provides a way to send an IP configuration to an encoder.
  6.9.1. Valid IP configuration in encoder shall not be required
  6.9.2. The encoder shall be identified by MAC address
  6.9.3. The IP configuration shall be sent using a broadcast message
  6.9.4. The target camera shall be connected to the same LAN subnet in order for the IP Broadcast Configuration Program to work
6.10. Registration Program—Creates e-Watch registration numbers. This program is NOT included on the e-Watch CRD. The following data are input:
  6.10.1. Hardware key serial number
  6.10.2. Module registration options
    6.10.2.1. Basic Services
    6.10.2.2. Gate Watch
    6.10.2.3. Gate Watch Custom
6.11. Auto Logon Enable Program—Enables the auto-logon feature. This program is NOT included on the e-Watch CED. It may be released as a separate software product.
  6.11.1. When the auto-logon feature is enabled, the auto logon screen (autologon.asp) shall cause an automatic logon with administrator privilege
  6.11.2. When the auto-logon feature is disabled, automatic logon shall not be possible

7. e-WATCH WATCHSTATION

The e-Watch WatchStation software implements the primary e-Watch user interface. The WatchStation is started from Microsoft Internet Explorer by entering a special URL in the address window. The WatchStation software is organized as a Logon Screen and a Monitor Screen.

A filter program is used to receive the digitized video streams, which are played using Microsoft Media Player ActiveX controls. The filter program is downloaded and installed on the WatchStation computer. No other software components are installed don the WatchStation computer. All other software components are downloaded from the e-Watch Server at runtime using Hypertext Transfer Protocol (HTTP).

The Logon Screen is presented first. If a user successfully logs on, the Monitor Screen is presented.

7.1. Logon Screen—Allows a user to log on to the e-Watch System.
  7.1.1. Five distinct URL types are used to start the Logon Screen
    7.1.1.1. Standard Logon
      7.1.1.1.1. URL points to logon.asp
      7.1.1.1.2. Starts an anonymous single screen WatchStation
    7.1.1.2. Logon with station name
      7.1.1.2.1. URL points to logon.asp?station=<stationname>
      7.1.1.2.2. Starts a named WatchStation, which may have one or more secondary screens
    7.1.1.3. Remote logon
      7.1.1.3.1. URL points to rlogon.asp
      7.1.1.3.2. Starts an anonymous single screen WatchStation which receives video streams using Transmission Control Protocol (TCP)
      7.1.1.3.3. The number of video panes is limited to four
    7.1.1.4. Single-pane logon
      7.1.1.4.1. URL points to logon.asp?station=lbw
      7.1.1.4.2. Starts an anonymous single screen WatchStation
      7.1.1.4.3. The number of video panes is limited to one
    7.1.1.5. Auto logon
      7.1.1.5.1. URL points to autologon.asp or autologon.asp?station=<stationname>
      7.1.1.5.2. Starts an anonymous or named WatchStation
      7.1.1.5.3. Performs an automatic logon with Administrator privilege, bypassing logon security
      7.1.1.5.4. Requires that auto logon be enabled at the server using the Auto Logon Enable program.
  7.1.2. The following interface controls are presented:

7.1.2.1. User ID textbox (all logon types except Auto)
7.1.2.2. Password textbox (all logon types except Auto)
7.1.2.3. Resolution option (Remote Logon type only)
7.1.2.4. Load last settings option (all except WatchBook and Auto logon types)
7.1.2.5. Logon button (all logon types)
7.1.3. Pressing the Enter key is equivalent to clicking the Logon button
7.2. Monitor Screen The monitor screen provides all of the user interface controls required to operate the e-Watch e-Watch system. The screen is organized as three windows. The Map Window is positioned in the upper left corner of the Monitor Screen and displays a map and object icons. The Video Window is positioned in the upper right corner of the Monitor Screen and displays images. The Control Window is positioned across the bottom of the Monitor Screen and contains operating controls.

The Monitor Screen operates in two distinct modes. Live Mode and Browse Mode. Live Mode is used to configure the system and to view real-time images. Browse Mode is used to retrieve and view images stored on the e-Watch Server.

A computer mouse is used extensively to interact with the WatchStation. The description of the WatchStation refers to the following mouse actions:

Left Click—one click with the left mouse button

Left Double-Click—two clicks with the left mouse button in rapid succession Right Click—one click with the right mouse button Drag—pressing and holding the left mouse button, then moving the cursor Drop—releasing the left mouse button after performing a Drag 7.2.1 Live Mode Live Mode provides the interface for viewing camera video in real time for controlling cameras, for receiving alerts, and for configuring the system.

7.2.1.1. Map Window
        7.2.1.1.1. Displays a map
        7.2.1.1.2. Right click on an empty area of the map displays a menu dialog, which contains the Maps option. Left click on the Maps option displays the Maps dialog.
        7.2.1.1.3. Displays any number of object icons.
            7.2.1.1.3.1. Hovering the mouse over an object icon displays the name of the Object.
            7.2.1.1.3.2. Each icon represents one of the following types of object:
                7.2.1.1.3.2.1. e-Watch site
                    7.2.1.1.3.2.1.1. Represented by a target icon
                    7.2.1.3.2.1.1.2. Left double-click causes the e-Watch site to be loaded Into the WatchStation
                7.2.1.1.3.2.2. e-Watch camera
                    7.2.1.1.3.2.2.1. Represented by a camera icon
                      7.2.1.1.3.2.2.1.1. Icon is normally blue
                      7.2.1.1.3.2.2.1.2. Icon is green while mouse hovers over camera Video in the Video indow
                      7.2.1.1.3.2.2.1.3. Icon blinks red when camera is alarmed
                      7.2.1.1.3.2.2.1.4. Icon may display a three-character alphanumeric map tag
                  7.2.1.1.3.2.2.2. The direction of the camera icon represents the direction in which the camera is pointed.
                  7.2.1.1.3.2.2.3. Drag from the icon and Drop into a Video Pane causes the video stream from the camera to be displayed in the Video Pane.
                  7.2.1.1.3.2.2.4. Left double-click causes the Video Window to be reconfigured as a single Video Pane and the video stream from the camera to be displayed in the Video Pane
                  7.2.1.1.3.2.2.5. Right click displays a menu dialog with some or all of the following options, depending on the user's permissions:
                      7.2.1.1.3.2.2.5.1. Events—left click displays the Events dialog
                      7.2.1.1.3.2.2.5.2. Zones—left click displays the Zones dialog
                      7.2.1.1.3.2.2.5.3. Camera—left click displays the Cameras dialog
                      7.2.1.1.3.2.2.5.4. Camera Controls—left click displays the Camera Control Dialog
                7.2.1.1.3.2.3. Third-party device
                    7.2.1.1.3.2.3.1. Represented by a door icon
                    7.2.1.1.3.2.3.2. Icon is normally blue
                    7.2.1.1.3.2.3.3. Icon blinks red when device is alarmed
        7.2.1.1.4. Site Select control
            7.2.1.1.4.1. Displays the names of all sites currently loaded into the WatchStation.
            7.2.1.1.4.2. Selected a site from the Site select control causes the current Map for that site to be displayed in the Map Window
        7.2.1.1.5. Map Select control
            7.2.1.1.5.1. Displays the names of all maps defined for the currently selected site.
            7.2.1.1.5.2. Selecting a map from the Map select control causes the map to be displayed in the Map Window and to become the current map for that site.
    7.2.1.2. Video Window
        7.2.1.2.1. Displays real-time video from e-Watch cameras in one, four, nine or Sixteen Video Panes. Video may be from individual cameras, or zones.
        7.2.1.2.2. Remote logon (see 7.1.1.4) shall restrict the number of video panes to four.
        7.2.1.2.3. Single-pane logon (see 7.1.1.5) shall restrict the number of video panes to one.
        7.2.1.2.4. Video display shall not be affected by the installation of multiple network adapters in the WatchStation computer.
        7.2.1.2.5. Video Panes that are not playing a video stream are termed inactive; Video Panes that are currently playing a video stream are termed active.
        7.2.1.2.6. Hovering the mouse over an active Video Pane causes the camera (or cameras in the case of a zone) to be represented in the Map Window as a green camera icon.
        7.2.1.2.7. If a Video Pane contains a zone the video stream from each camera in the zone is rotated into the Video Pane in accordance with the zone's defined cycle time.
        7.2.1.2.8. A Video Pane Label is positioned immediately below each Video Pane.
        7.2.1.2.9. For inactive Video Panes, the pane number is displayed in the Video Pane Label.
        7.2.1.2.10. For active Video Panes, the Map Tag, Camera Name and video stream type are displayed in the Video Pane Label.
        7.2.1.2.11. Each Video Pane displays a blinking red border when playing a video stream from an alarmed camera.
        7.2.1.2.12. From an active Video Pane causes the camera or zone to be removed from that Video Pane.
        7.2.1.2.13. Drag from a Map Window icon, active Video Pane, or other component, and Drop into a Video Pane causes the video stream to be displayed in that Video Pane.

7.2.1.2.14. Left click in an active Video Pane displays the Camera Control Dialog if any controls are available.

7.2.1.2.15. While the Camera Control Dialog is displayed, the Map Tag and Camera Name displayed across the bottom of the Video Pane are in green font.

7.2.1.2.16. Left double-click in an active Video Pane causes the Video Window to be reconfigured as a single Video Pane and the video stream to be displayed in the Video Pane.

7.2.1.2.17. Right click in an active Video Pane displays a menu dialog with the following data and options:
   7.2.1.2.17.1. Camera or Zone name
   7.2.1.2.17.2. Video Properties—left click displays the Video Properties dialog
   7.2.1.2.17.3. Video Statistics—left click displays the Video Statistics dialog
   7.2.1.2.17.4. Events—left click displays the Events dialog
   7.2.1.2.17.5. Zones—left click displays the Zones dialog
   7.2.1.2.17.6. Cameras—left click displays the Cameras dialog
   7.2.1.2.17.7. Camera Controls—left click displays the Camera Control Dialog (not available when the Video Pane contains a zone)

7.2.1.2.18. Monitor select buttons—Presented only for named WatchStations with one or more secondary screens
   7.2.1.2.18.1. The Video Window in the Monitor Screen is termed the Primary Screen, and is represented by the button labeled "P".
   7.2.1.2.18.2. The Video Windows in the secondary screens are represented by the buttons labeled with the secondary screen numbers.
   7.2.1.2.18.3. When the Primary Screen button is selected, Video Window operations affect only the Primary Screen.
   7.2.1.2.18.4. When a numbered secondary screen button is selected, Video Window operations affect the Primary Screen, and are duplicated in the Video Window of the secondary screen. The Primary Screen is used to control the secondary screens in this manner.

7.2.1.2.19. Panes select buttons—Presented by all WatchStations except the single-pane WatchStation
   7.2.1.2.19.1. The Video window may be configured to have one four, nine, or sixteen Video Panes by selecting the corresponding Panes select button.
   7.2.1.2.19.2. If the Video Window is reconfigured to a single Video Pane by a left double-click either on a Map Window icon or on an active Video Pane, selecting one of the other Panes select buttons will restore the original Video Window configuration.
   7.2.1.2.19.3. If a Video Pane is playing a video stream, is then hidden by reducing the number of panes displayed, and is then revealed by increasing the number of panes displayed, the original video stream will continue to be played in that Video Pane.

7.2.1.2.20. Image size buttons—Presented only by the single-pane WatchStation
   7.2.1.2.20.1. Original image size button
   7.2.1.2.20.2. 2X (double) original image size button
   7.2.1.2.20.3. Full-pane size button 7.2.1.3 Control Window The Control Window contains the following controls:

7.2.1.3.1. Live button—does nothing in live mode 7.2.1.3.2. Browse button—switches WatchStation to Browse Mode 7.2.1.3.3. Events button—displays the Events dialog 7.2.1.3.4. Zones button—displays the Zones dialog 7.2.1.3.5. Cameras button—displays the Cameras dialog (available only if Gate Watch is not installed)

7.2.1.3.6. Devices button—displays a menu dialog with the following options (available only if Gate Watch is installed):
   7.2.1.3.6.1. Cameras—displays the Cameras dialog
   7.2.1.3.6.2. $3^{rd}$ party Devices—displays the Devices dialog 7.2.1.3.7. Maps button—displays the Maps dialog 7.2.1.3.8. Users button—displays the Users dialog 7.2.1.3.9. List Cameras button—displays the List Cameras dialog 7.2.1.3.10. List Zones button—displays the List Zones dialog 7.2.1.3.11. Event Reports button
   7.2.1.3.11.1. If Gate Watch is not installed, displays the Camera Report Setup dialog.
   7.2.1.3.11.2. If Gate Watch is installed, displays a menu dialog with the Following options;
      7.2.1.3.11.2.1. Camera Report—left click displays the Camera Report Setup dialog.
      7.2.1.3.11.2.2. Gate Watch Standard Report—left click displays the Gate-Watch Standard Report dialog.
      7.2.1.3.11.2.3. If Gate Watch Custom is installed the following two Additional options are available:
         7.2.1.3.11.2.3.1. Gate Watch Custom Setup—left click displays the Gate Watch Custom Setup dialog.
         7.2.1.3.11.2.3.2. Gate Watch Custom Report—left click displays the Gate Watch Custom Report dialog.

7.2.1.3.12. Dam Controls button
   7.2.1.3.12.1. If the Camera Controls button is left-clicked while the Camera Control Dialog is currently displayed, then the Camera Controls are hidden, and the button gains an outset appearance.
   7.2.1.3.12.2. If the Camera Controls button is left-clicked while the Camera Control Dialog is not displayed, then the Camera Control Dialog for the first visible video stream that supports Camera Controls is displayed, and the button gains an inset appearance.
   7.2.1.3.12.3. If the Camera Controls are for a Pelco camera, then the Camera Controls button is hidden because of the size of the control panel. In order to hide the camera controls, you must click on the window close box in the upper right corner of the Camera Controls.
   7.2.1.3.12.4. The Camera Controls shall load immediately, without having to wait for data to be retrieved from the camera or the server 7.2.1.3.13. Arm/Disarm controls
   7.2.1.3.13.1. System Armed/Disarmed label—indicates whether the e-Watch system is Armed or Disarmed
   7.2.1.3.13.2. Arm/Disarm button—Arms the system (if currently Disarmed), or Disarms the system (if currently Armed)
   7.2.1.3.13.3. If the system is Disarmed, the system will not send any defined alerts and WatchStations will not perform the Zoom-To-Alarm behavior; alarmed cameras, devices and Video Panes will have a blinking red appearance even if the system is disarmed if the event is addressed in the alarm profile.
   7.2.1.3.13.4. If the system is Armed, the system will send alerts for alarm conditions as defined in the Events dialog, and WatchStations will perform Zoom-To-Alarm behavior upon receipt of an alert 7.2.1.3.13.5. Disarming and re-Arming the system shall reset the alert suppress feature, and cause new events on already alarmed devices to trigger alerts 7.2.1.3.14. Zoom-To-Alarm checkbox 7.2.1.3.14.1. When unchecked, receipt of an alert will not cause the WatchStation to perform Zoom-To-Alarm behavior 7.2.1.3.14.2. When checked, a receipt of an alert will cause the WatchStation to perform Zoom-To-Alarm behavior 7.2.1.3.14.2.1. If the alert is for a camera, the Video Window is reconfigured to a single Video Pane, and the video stream from the alarmed camera is displayed in the Video Pane 7.2.1.3.14.2.2. If the alert is for a $3^{rd}$ party device (Gate Watch™ only), the Video Window is reconfigured to four Video Panes, and the video streams from the four cameras closest to the alarmed device are displayed in the Video Panes.

7.2.1.3.15. Logon button 7.2.1.3.15.1. Displays the name of the user currently logged on.

7.2.1.3.15.2. Clicking the button displays the Logon dialog.

7.2.1.3.16. Sites button—displays the Sites dialog 7.2.1.3.17. Presets button—displays the Presets dialog 7.2.1.3.18. Help button—displays the e-Watch online documentation 7.2.1.3.19. Date/Time label 7.2.1.3.19.1. Displays the current WatchStation date and time.

7.2.1.3.19.2. Named WatchStations periodically synchronize the date and time with the e-Watch Server.

7.2.1.4. Live Mode Dialogs

The following dialogs are displayed using various Live Mode Controls as described above.

7.2.1.4.1 Events Dialog

The e-Watch System detects Events, uses date and time Profiles to determine Alarm conditions, an issues Alerts in response to Alarm conditions. The Events dialog is used to set up the system parameters governing Events, Profiles, Alarms and Alerts.

An Event is motion detected by an e-Watch camera, or receipt of a message from a $3^{rd}$ party device (Gate Watch only).

Not all Events are Alarms. Often, motion detected by an e-Watch camera should not be considered an Alarm condition. Profiles are used to define on what days and during what time periods, Events are to be considered Alarm conditions. So, for example a Profile could be set up so that motion detected by a particular e-Watch camera after midnight on weekends is considered an Alarm condition.

The Events Dialog is organized into three tabbed sections: Profiles, Alarms and Alerts.

7.2.1.4.1.1 Profiles

A Profile is a list of date and time periods. Motion that is detected by an e-Watch camera within a time period defined in a profile may be considered an alarm condition. Similarly, the receipt of a $3^{rd}$ party device message within a time period defined in a profile may be considered an alarm condition.

7.2.1.4.1.1.1. Arm/Disarm button—Arms or Disarms the e-Watch system, as described above under Control Window 7.2.1.4.1.1.2. Profile list—Lists all profiles currently defined in the system 7.2.1.4.1.1.3. Add Button—Accepts a new Profile name and displays the Alarm Time Edit dialog described below 7.2.1.4.1.1.4. Remove button—Removes the highlighted Profile from the system 7.2.1.4.1.1.5. Edit button—displays the Alarm Profile Edit dialog 7.2.1.4.1.1.6. OK button—closes the dialog 7.2.1.4.1.1.7. Sub-dialogs 7.2.1.4.1.1.7.1. Alarm Profile Edit dialog—contains the following controls:

7.2.1.4.1.1.7.1.1. Profile name 7.2.1.4.1.1.7.1.2. List of date and time periods 7.2.1.4.1.1.7.1.3. Add button—displays the Alarm Time Edit dialog 7.2.1.4.1.1.7.1.4. Remove button—removes the highlighted date/time from the Profile 7.2.1.4.1.1.7.1.5. Edit button—displays the Alarm Time Edit dialog 7.2.1.4.1.1.7.1.6. OK button—closes the dialog 7.2.1.4.1.1.7.2. Alarm Time Edit dialog—permits adding or changing a date/time period. The dialog contains the following controls:

7.2.1.4.1.1.7.2.1. Day of week 7.2.1.4.1.1.7.2.2. From time 7.2.1.4.1.1.7.2.3. Through time 7.2.1.4.1.1.7.2.4. Always selection—This day of week and time period is always in effect 7.2.1.4.1.1.7.2.5. Once selection—This day of week and time period is in effect once, then removed from the system 7.2.1.4.1.1.7.2.6. Specific Date selection—This time period is in effect only on the selected date 7.2.1.4.1.1.7.2.7. Continue button—saves changes and closes the dialog 7.2.1.4.1.1.7.2.8. Cancel button—discards changes and closes the dialog 7.2.1.4.1.2. Alarms The Alarm tab is used to associate an e-Watch camera or $3^{rd}$ party device with a Profile, and thereby to determine when an Event detected by that camera or device is considered an Alarm condition.

Cameras are associated with a Profile using the Motion tab.

7.2.1.4.1.2.1. Motion tab—contains the following controls 7.2.1.4.2.1.1. Site select control 7.2.1.4.2.1.1.1. Displays all sites currently loaded into the WatchStation 7.2.1.4.2.1.1.2. Selecting a site limits the camera list to cameras in the selected site 7.2.1.4.1.2.1.2. Camera list—displays the following data 7.2.1.4.1.2.1.2.1. Camera name 7.2.1.4.1.2.1.2.2. Associated Profile 7.2.1.4.1.2.1.2.3. Status—On or Off 7.2.1.4.1.2.1.3. Add button—allows selecting a camera, and displays the Select Profile dialog 7.2.1.4.1.2.1.4. Remove button—removes the highlighted camera/profile association from the system 7.2.1.4.1.2.1.5. Edit button—displays the Select Profile dialog 7.2.1.4.1.2.1.6. OK button—closes the dialog 7.2.1.4.1.2.1.7. Select Profile dialog—contains the following controls:
  7.2.1.4.1.2.1.7.1. Activate checkbox; if unchecked, the status of the camera/profile association is Off, and camera events are never considered Alarm conditions; if checked, the status of the camera/Profile association is On.
  7.2.1.4.1.2.1.7.2. Profile list—lists all defined Profiles
  7.2.1.4.1.2.1.7.3. Cancel button—discards changes and closes the dialog
  7.2.1.4.1.2.1.7.4. Continue button—associates the camera with the selected Profile and closes the dialog. The new association is then displayed under the Motion tab. $3^{rd}$ Party devices are associated with a Profile using the Event tab
7.2.1.4.1.2.2. Event tab—contains the following controls
  7.2.1.4.1.2.2.1. Site select control
    7.2.1.4.1.2.2.1.1. Displays all sites currently loaded into the Watch Station
    7.2.1.4.1.2.2.1.2. Selecting a site limits the device list to devices in the selected site.
  7.2.1.4.1.2.2.2. $3^{rd}$ Party Device list—displays the following data
    7.2.1.4.1.2.2.2.1. Device Name
    7.2.1.4.1.2.2.2.2. Associated Profile
    7.2.1.4.1.2.2.2.3. Status—On or Off
  7.2.1.4.1.2.2.3. Add button—allows selecting a device, and displays the Select Event Profile dialog
  7.2.1.4.1.2.2.4. Remove button—removes the highlighted device/profile association from the system
  7.2.1.4.1.2.2.5. Edit button—displays the Select Event Profile dialog
  7.2.1.4.1.2.2.6. OK button—closes the dialog
  7.2.1.4.1.2.2.7. Select Event Profile dialog—contains the following controls:
    7.2.1.4.1.2.2.7.1. Activate checkbox; if unchecked, the status of the device/profile association is Off, and device Events are never considered Alarm conditions; if checked, the status of the device/Profile association is On
    7.2.1.4.1.2.2.7.2. Profile list—lists all defined profiles
    7.2.1.4.1.2.2.7.3. Cancel button—discards changes and closes the dialog
    7.2.1.4.1.2.2.7.4. Continue button associates the device with the selected Profile and closes the dialog. The new association is then displayed under the Event tab.
7.2.1.4.1.3. Alerts Alerts are responses that the e-Watch system can make when an Alarm condition is detected. Alerts are organized into tabbed sections, one for each type of alert.
  7.2.1.4.1.3.1. Stations—Station alerts are popup messages that appear on named WatchStations. This section contains the following controls:
    7.2.1.4.1.3.1.1. Station list—displays the following data:
      7.2.1.4.1.3.1.1.1. Station name
      7.2.1.4.1.3.1.1.2. Station IP address
      7.2.1.4.1.3.1.1.3. Status—On or Off
    7.2.1.4.1.3.1.2. Ad button—displays the Station dialog
    7.2.1.4.1.3.1.3. Remove button—removes the highlighted Station from the system
    7.2.1.4.1.3.1.4. Edit button—displays the Station dialog
    7.2.1.4.1.3.1.5. OK button—closes the dialog
    7.2.1.4.1.3.1.6. Station dialog—contains the following controls:
      7.2.1.4.1.3.1.6.1. Activate checkbox; if unchecked, the status of the Station is Off, and popup messages are never displayed by the Station; if checked, the status of the Station is On.
      7.2.1.4.1.3.1.6.2. Station name
      7.2.1.4.1.3.1.6.3. Station IP address
      7.2.1.4.1.3.1.6.4. Continue button—saves changes and closes the dialog.
      7.2.1.4.1.3.1.6.5. Cancel button—discards changes and closes the dialog
  7.2.1.4.1.3.2. Pagers—Pager alerts are calls sent to digital pages. This selection contains the following controls:
    7.2.1.4.1.3.2.1. Pager list—displays the following data:
      7.2.1.4.1.3.2.1.1. Name
      7.2.1.4.1.3.2.1.2. Dial string
      7.2.1.4.1.3.2.1.3. Status—On or Off
    7.2.1.4.1.3.2.2. Add button—displays the Pager dialog
    7.2.1.4.1.3.2.3. Remove button—removes the highlighted Pager from the system
    7.2.1.4.1.3.2.4. Edit button—displays the Pager dialog
    7.2.1.4.1.3.2.5. OK button—closes the dialog
    7.2.1.4.1.3.2.6. Pager dialog—contains the following controls:
      7.2.1.4.1.3.2.6.1. Activate checkbox; if unchecked, the status of the Pager is Off, and calls are never made to the Pager; if checked, the status of the Pager is On.
      7.2.1.4.1.3.2.6.2. Name
      7.2.1.4.1.3.2.6.3. Dial string
      7.2.1.4.1.3.2.6.4. Continue button—saves changes and closes the dialog.
      7.2.1.4.1.3.2.6.5. Cancel button—discards changes and closes the dialog
  7.2.1.4.1.3.3. E-Mail—E-mail alerts are electronic mail messages. This section contains the following controls:
    7.2.1.4.1.3.3.1. E-Mail List—displays the following data:
      7.2.1.4.1.3.3.1.1. Name
      7.2.1.4.1.3.3.1.2. Address
      7.2.1.4.1.3.3.1.3. Status—On or Off
    7.2.1.4.1.3.3.2. Add button—display the E-Mail dialog
    7.2.1.4.1.3.3.3. Remove button—removes the highlighted E-Mail from the system
    7.2.1.4.1.3.3.4. Edit button—displays the E-Mail dialog
    7.2.1.4.1.3.3.5. OK button—closes the dialog
    7.2.1.4.1.3.3.6. E-Mail dialog—contains the following controls:
      7.2.1.4.1.3.3.6.1. Activate checkbox; if unchecked, the status of the E-Mail is Off, and messages are never sent to the E-Mail address; if checked, the status of the E-Mail is On.
      7.2.1.4.1.3.3.6.2. Name
      7.2.1.4.1.3.3.6.3. Address 7.2.1.4.1.3.3.6.4. Continue button—saves changes and closes the dialog.
7.2.1.4.1.3.3.6.5. Cancel button—discards changes and closes the dialog
7.2.1.4.1.3.4. Voice—Voice alerts are calls made to voice telephones. This section contains the following controls:
7.2.1.4.1.3.4.1. Voice Call list—displays the following data:
7.2.1.4.1.3.4.1.1. Name
7.2.1.4.1.3.4.1.2. Dial string
7.2.1.4.1.3.4.1.3. Status—On or Off
7.2.1.4.3.4.2. Add button—displays the Voice dialog
7.2.1.4.1.3.4.3. Remove button—removes the highlighted Voice Call from the system
7.2.1.4.1.3.4.4. Edit button—displays the Voice dialog
7.2.1.4.1.3.4.5. OK button—closes the dialog
7.2.1.4.1.3.4.6. Voice dialog—contains the following controls:
7.2.1.4.1.3.4.6.1. Activate checkbox; if unchecked, the status of the Voice Call is Off, and calls are never made; if checked the status of the Voice Call is On.
7.2.1.4.1.3.4.6.2. Name
7.2.1.4.1.3.4.6.3. Dial string
7.2.1.4.1.3.4.6.4. Continue button—saves changes and closes the dialog
7.2.1.4.1.3.4.6.5. Cancel button—discards changes and closes the dialog
7.2.1.4.2. Zones Dialog Zones are ordered collections of e-Watch cameras. Zones are used to view multiple cameras in a single Video Pane. Zones can be Dropped into a Video Pane in the same way as individual cameras. When a Zone is Dropped into a Video Pane, the video streams from the cameras in the Zone are rotated into the Video Pane in accordance with the Zone's cycle time.

The Zones dialog contains the following components:
7.2.1.4.2.1. Find button and textbox—used to find a camera in the camera list, as follows:
7.2.1.4.2.1.1. Enter a text string in the textbox.
7.2.1.4.2.1.2. Click the Find button.
7.2.1.4.2.1.3. The camera names in the camera list are searched for a match to the text in the textbox.
7.2.1.4.2.1.4. The search starts with the first camera after the currently highlighted camera, if any.
7.2.1.4.2.1.5. If a match is found, the camera name is highlighted.
7.2.1.4.2.2. Site select control
7.2.1.4.2.2.1. Displays all sites currently loaded into the WatchStation.
7.2.1.4.2.2.2. Selecting a site limits the camera list to cameras in the selected site.
7.2.1.4.2.3. Camera list
7.2.1.4.2.3.1. Lists all cameras in the selected site.
7.2.1.4.2.3.2. Cameras can be Dragged from the camera list, and dropped into the Zone camera slots.
7.2.1.4.2.4. Zone name—the zone name can be Dragged and Dropped into a Video Pane.
7.2.1.4.2.5. Cycle time—determines the number of seconds between video rotation when a Video Pane contains a Zone.
7.2.1.4.2.6. Camera slots
7.2.1.4.2.6.1. A camera can be Dragged form the camera list and Dropped into a camera slot to add the camera to the Zone
7.2.1.4.2.6.2. A camera can be Dragged from one camera slot to another camera slot to rearrange the cameras
7.2.1.4.2.6.3. A camera can be ragged from a camera slot and Dropped anywhere other than a camera slot to remove the camera from the Zone
7.2.1.4.2.7. Load Zone button—displays the Load Zone dialog
7.2.1.4.2.8. Save Zone button—displays the Save Zone dialog
7.2.1.4.2.9. New Zone button
7.2.1.4.2.9.1. Sets the zone name to "new zone"
7.2.1.4.2.9.2. Sets the cycle time to 5 seconds
7.2.1.4.2.9.3. Clears the camera slots
7.2.1.4.2.10. Delete Zone button—removes the Zone from the system
7.2.1.4.2.11. OK button—closes the dialog
7.2.1.4.2.12. Sub-dialogs
7.2.1.4.2.12.1. Zone dialog—contains the following components:
7.2.1.4.2.12.1.1. Zone select control—contains all defined Zones
7.2.1.4.2.12.1.2. OK button—loads the selected Zone and closes the dialog
7.2.1.4.2.12.1.3. Cancel button—closes the dialog
7.2.1.4.2.12.2. Save Zone dialog—contains the following components
7.2.1.4.2.12.2.1. Zone name
7.2.1.4.2.12.2.2. OK button—saves the Zone and closes the dialog
7.2.1.4.2.12.2.3. Cancel button—closes the dialog
7.2.1.4.3. Cameras Dialog The Cameras dialog provides the interface for creating, editing and deleting camera definitions.

The initial screen of the Cameras Dialog contains the following components:
7.2.1.4.3.1. Site select control
7.2.1.4.3.1.1. Displays all sites currently loaded into the WatchStation
7.2.1.4.3.1.2. Selecting a site limits the camera list to cameras in the selected site.
7.2.1.4.3.1.3. Displays an "all" selection to include all cameras in the camera list.
7.2.1.4.3.2. Camera list—lists all cameras in the selected site, or all cameras
7.2.1.4.3.3. Add button—displays the Camera Definition dialog.
7.2.1.4.3.4. Delete button
7.2.1.4.3.4.1. Removes the highlighted camera from the system
7.2.1.4.3.4.2. A camera cannot be removed if it is shown on any Site Map.
7.2.1.4.3.5. Edit button—displays the Camera Definition dialog.
7.2.1.4.3.6. OK button—saves changes and closes the dialog.
7.2.1.4.3.7. Cancel button—discards changes and closes the dialog
7.2.1.4.3.8. Camera Definition dialog The Camera Definition dialog is organized into three tabbed sections: Setup, IP and Control.
7.2.1.4.3.8.1. Setup Section—contains the following components:
7.2.1.4.3.8.1.1. MAC Address
7.2.1.4.3.8.1.2. IP Address
7.2.1.4.3.8.1.3. Friendly Name 7.2.1.4.3.8.1.4. Archive High-Res video selection—if checked, SIF MPEG from the camera will be saved on the e-Watch Server 7.2.1.4.3.8.1.5. Archive Low-Res video selection—if checked, QSIF MPEG or Motion JPEG from the camera will be saved on the e-Watch Server.

7.2.1.4.3.8.1.6. Archive JPEG selection—if checked, full-frame JPEG images from the camera will be saved on the e-Watch Server.

7.2.1.4.3.8.1.7. External Device—lists optional external devices supported by e-Watch 7.2.1.4.3.8.1.8. OK button—saves changes and closes the dialog 7.2.1.4.3.8.1.9. Cancel button—discards changes and closes the dialog 7.2.1.4.3.8.2. IP Section—contains the following controls:

7.2.1.4.3.8.2.1. Automatic or Fixed IP configuration selection 7.2.1.4.3.8.2.2. IP Address (disabled if Auto)

7.2.1.4.3.8.2.2.1. Changing the IP Address shall cause all Monitor Stations currently viewing the video to switch to The new IP Address 7.2.1.4.3.8.2.3. Subnet Mask (disabled if Auto)

7.2.1.4.3.8.2.4. Gateway (disabled if Auto)

7.2.1.4.3.8.2.5. Automatic or Fixed e-Watch Server address selection 7.2.1.4.3.8.2.6. e-Watch Server Address (disabled if Auto)

7.2.1.4.3.8.2.7. Automatic or Fixed Time-To-Live selection 7.2.1.4.3.8.2.8. Time-To-Live (disabled if Auto)

7.2.1.4.3.8.2.9. Apply button—applies changes 7.2.1.4.3.8.2.10. Reset button—restores initial values 7.2.1.4.3.8.2.11. OK button—saves changes and closes the dialog.

7.2.1.4.3.8.2.12. Cancel button—discards changes and closes the dialog 7.2.1.4.3.8.3. Control Section—contains the following controls The Control Section is organized into four tabbed sections: Picture, Streams, JPEG, and Encoder 7.2.1.4.3.8.3.1. Picture section—contains the following controls:

7.2.1.4.3.8.3.1.1. Brightness 7.2.1.4.3.8.3.1.2. Contrast 7.2.1.4.3.8.3.1.3. Saturation 7.2.1.4.3.8.3.1.4. Hue 7.2.1.4.3.8.3.1.5. Apply button—applies changes 7.2.1.4.3.8.3.1.6. Reset button—restores initial values 7.2.1.4.3.8.3.1.7. OK button—saves changes and closes the dialog.

7.2.1.4.3.8.3.2. Streams section—contains the following controls:

7.2.1.4.3.8.3.2.1. JPEg STREAM On or Off 7.2.1.4.3.8.3.2.2. Low Resolution stream type, choice of
      QSIF
      Motion JPEG
      Changing the low bandwidth stream type shall cause all Monitor Stations currently viewing the video to switch to the new stream type 7.2.1.4.3.8.3.2.3. Motion JPEG controls (hidden if QSIF selected)
      Max bandwidth
      Frame rate 7.2.1.4.3.8.3.2.4. Low Resolution stream On or Off 7.2.1.4.3.8.3.2.5. High Resolution stream On or Off 7.2.1.4.3.8.3.2.6. Apply button—applies changes 7.2.1.4.3.8.3.2.7. Reset button—saves changes and closes the dialog.

7.2.1.4.3.8.3.2.8. OK button—saves changes and closes the dialog 7.2.1.4.3.8.3.2.9. Cancel button—discards changes and closes the dialog.

7.2.1.4.3.8.3.3. JPEG section—contains the following controls 7.2.1.4.3.8.3.3.1. Image Resolution, choice of:
      Full size
      SIF
      QSIF 7.2.1.4.3.8.3.3.2. Quality 7.2.1.4.3.8.3.3.3. Image rate 7.2.1.4.3.8.3.3.4. Motion Detect Sensitivity Threshold 7.2.1.4.3.8.3.3.5. Motion Detect Sensitivity Percent Pixel Change 7.2.1.4.3.8.3.3.6. Apply button—applies changes 7.2.1.4.3.8.3.3.7. Reset button—restores initial values 7.2.1.4.3.8.3.3.8. OK button—saves changes and closes the dialog.

7.2.1.4.3.8.3.3.9. Cancel button—discards changes and closes the Dialog 7.2.1.4.3.8.3.4. Encoder section—contains the following controls 7.2.1.4.3.8.3.4.1. Video source (hidden if not applicable)

7.2.1.4.3.8.3.4.2. Pan/Tilt orientation (hidden if not applicable)

7.2.1.4.3.8.3.4.3. Firmware version display 7.2.1.4.3.8.3.4.4. Firmware download button—left click causes the Camera to reset 7.2.1.4.3.8.3.4.5. Reset Encoder button—left click causes the Camera to reset 7.2.1.4.3.8.3.4.6. Apply button—applies changes 7.2.1.4.3.8.3.4.7. Reset button—restores initial values 7.2.1.4.3.8.3.4.8. OK button—restores initial values 7.2.1.4.3.8.3.4.9. Cancel button—discards changes and closes the Dialog 7.2.1.4.4. 3$^{rd}$ Party Devices (Define Devices) Dialog The 3$^{rd}$ Party Devices Dialog is available only with Gate Watch installed. The dialog provides the interface for defining 3$^{rd}$ party devices connected to the e-Watch system through the Gate Watch interface.

The 3$^{rd}$ Party Devices Dialog is organized into three tabbed sections: Types, Sources, and Devices 7.2.1.4.4.1. Types section—contains the following controls:

7.2.1.4.4.1.1. Types list—lists all defined device types 7.2.1.4.4.1.2. Add button—displays the Types dialog 7.2.1.4.4.1.3. Edit button—displays the Types dialog 7.2.1.4.4.1.4. Delete button—removes the highlighted type from the System
7.2.1.4.4.1.5. OK button—closes the dialog
7.2.1.4.4.1.6. Types Dialog contains the following controls
   7.2.1.4.4.1.6.1. Type Name
   7.2.1.4.4.1.6.2. Continue button—saves changes and closes the Dialog
   7.2.1.4.4.1.6.3. Cancel button—discards changes and closes the dialog
7.2.1.4.4.2. Sources section—contains the following controls:
   7.2.1.4.4.2.1. Sources list—lists all defined device sources
   7.2.1.4.4.2.2. Add button—displays the dialog
   7.2.1.4.4.2.3. Edit button—displays the Sources dialog
   7.2.1.4.4.2.4. Delete button—removes the highlighted source from the System
   7.2.1.4.4.2.5. OK button—closes the dialog
   7.2.1.4.4.2.6. Sources Dialog—contains the following controls
      7.2.1.4.4.2.6.1. Source name
      7.2.1.4.4.2.5.2. Continue button—saves changes and closes the dialog
      7.2.1.4.4.2.6.3. Cancel button—discards changes and closes the dialog
7.2.1.4.4.3. Devices section—contains the following controls:
   7.2.1.4.4.3.1. Devices list—displays the following data:
      7.2.1.4.4.3.1.1. Identifier
      7.2.1.4.4.3.1.2. Type
      7.2.1.4.4.3.1.3. Source
   7.2.1.4.4.3.2. Add button—displays the Devices dialog
   7.2.1.4.4.3.3. Edit button—displays the Devices dialog
   7.2.1.4.4.3.4. Delete button—removes the highlighted device from The system
   7.2.1.4.4.3.5. OK button—closes the dialog
   7.2.1.4.4.3.6. Devices Dialog—contains the following controls
      7.2.1.4.4.3.6.1. Identifier
      7.2.1.4.4.3.6.2. Type list
      7.2.1.4.4.3.6.3. Source list
      7.2.1.4.4.3.6.4. Continue button—saves changes and closes the dialog
      7.2.1.4.4.3.6.5. Cancel button—discards changes and closes the Dialog
7.2.1.4.5. Maps Dialog
The Maps Dialog provide the interface for defining Site Maps, and for adding icons representing other sites, cameras, or $3^{rd}$ party devices.
   7.2.1.4.5.1. Map Select Control
      7.2.1.4.5.1.1. Displays all defined maps
      7.2.1.4.5.1.2. Selecting a map causes the map to be loaded into the dialog
   7.2.1.4.5.2. Map ID—display only
   7.2.1.4.5.3. Map Name
   7.2.1.4.5.4. Image File URL—URL of map file on e-Watch Server
   7.2.1.4.5.5. Image width in pixels
   7.2.1.4.5.6. Image height in pixels
   7.2.1.4.5.7. Save button—left click saves changes
   7.2.1.4.5.8. Cancel button—left click restores initial values and settings
   7.2.1.4.5.9. New button—left click clears all values and settings
   7.2.1.4.5.10. Delete button—removes the map from the system
   7.2.1.4.5.11. OK button—closes the dialog
   7.2.1.4.5.12. Sites And WatchStations button—left click displays the Site and WatchStations dialog
   7.2.1.4.5.13. Map—displays the map image
      7.2.1.4.5.13.1. Sites on the map are represented by target icons
      7.2.1.4.5.13.2. $3^{rd}$ party devices on the map are represented by door icons
      7.2.1.4.5.13.3. Cameras on the map are represented by camera icons
         7.2.1.4.5.13.3.1. A camera icon may display a three-character alphanumeric map tag
         7.2.1.4.5.13.3.2. The direction of the camera icon represents the direction in which the camera is pointed
      7.2.1.4.5.13.4. A site, $3^{rd}$ party device, or camera may be Dragged from one of the object lists and Dropped onto the map to add the object to the map
      7.2.1.4.5.13.5. An icon on the map may be Dragged from the map and Dropped onto the map to reposition the icon
      7.2.1.4.5.13.6. An icon on the map may be Dragged and Dropped off of the map to remove the icon from the map
      7.2.1.4.5.13.7. Dropping a camera onto the map displays the Map Tag dialog, which contains the following controls
         7.2.1.4.5.13.7.1. Map Tag—three-character alphanumeric tag
         7.2.1.4.5.13.7.2. Rotation buttons—left click causes the camera icon to rotate in the indicated direction
         7.2.1.4.5.13.7.3. OK button—left click closes the dialog
   7.2.1.4.5.14. Sites list
      7.2.1.4.5.14.1. Displays all defined sites
      7.2.1.4.5.14.2. Sites may be Dragged from the list and Dropped onto the map
   7.2.1.4.5.15. Devices list
      7.2.1.4.5.15.1. Displays all defined sites
      7.2.1.4.5.15.2. Sites may be Dragged from the list and Dropped onto the map
   7.2.1.4.5.16. Cameras list
      7.2.1.4.5.16.1. Displays all defined cameras
      7.2.1.4.5.16.2. Cameras may be Dragged from the list and Dropped Onto the map
7.2.1.4.6. Sites and WatchStations Dialog
The Sites and WatchStations Dialog provides the interface for defining e-Watch Sites, and for defining named WatchStations. Named WatchStations may have multiple secondary screens.
The Sites and WatchStations Dialog is organized into two tabbed sections, Sites and WatchStations.
   7.2.1.4.6.1. Sites section—contains the following controls
      7.2.1.4.6.1.1. Site Select control
         7.2.1.4.6.1.1.1. Displays all defines sites
         7.2.1.4.6.1.1.2. Selecting a site causes the site to be loaded into the dialog.
      7.2.1.4.6.1.2. Site name
      7.2.1.4.6.1.3. Maps list—displays maps included in the site 7.2.1.4.6.1.4. Available Maps list—displays defined maps not included in the site
7.2.1.4.6.1.5. Add Map button—transfers the map highlighted in the Available Maps list from the Available Maps list to the Maps list, thus adding the map to the site.
7.2.1.4.6.1.6. Remove Map button—transfers the map highlighted in the Maps list from the Maps list to the Available Maps list, thus removing he map from the site.
7.2.1.4.6.1.7. Add button—Clears all values and settings
7.2.1.4.6.1.8. Update button—applies changes
7.2.1.4.6.1.9. Cancel button—discards changes
7.2.1.4.6.1.10. Delete button—removes the site from the system
7.2.1.4.6.1.11. OK button—closes the dialog
7.2.1.4.6.2. WatchStations section—contains the following controls
7.2.1.4.6.2.1. WatchStation select control
7.2.1.4.6.2.1.1. Displays all defines WatchStations
7.2.1.4.6.2.1.2. Selecting a WatchStation causes the WatchStation To be loaded into the dialog
7.2.1.4.6.2.2. WatchStation name
7.2.1.4.6.2.3. WatchStation IP address
7.2.1.4.6.2.4. Secondary Addresses list—displays the IP addresses of all secondary screens
7.2.1.4.6.2.5. Add button—Clears all values and settings
7.2.1.4.6.2.6. Update button—applies changes
7.2.1.4.6.2.7. Cancel button—discards changes
7.2.1.4.6.2.8. Delete button—removes the site from the system
7.2.1.4.6.2.9. OK button—closes the dialog
7.2.1.4.7. Users Dialog
The Users Dialog provides the interface for defining e-Watch system users. The Users Dialog contains the following components:
7.2.1.4.7.1. User select control
7.2.1.4.7.1.1. Displays all defined users
7.2.1.4.7.1.2. Selecting a user causes the user to be loaded into the Dialog
7.2.1.4.7.2. User ID
7.2.1.4.7.3. Password
7.2.1.4.7.4. User Name
7.2.1.4.7.5. Authority select control, offer the choice of:
7.2.1.4.7.5.1. User
7.2.1.4.7.5.2. Investigator
7.2.1.4.7.5.3. Administrator
7.2.1.4.7.6. Save button—saves changes
7.2.1.4.7.7. Cancel button—discards changes
7.2.1.4.7.8. New button—clears all values and settings
7.2.1.4.7.9. Delete button—removes the user from the system
7.2.1.4.7.10. OK button—closes the dialog
7.2.1.4.8. List Cameras Dialog
The List Cameras Dialog lists the cameras from all sites currently loaded into the WatchStation, and provides a convenient way to Drag a camera into a Video Pane. The List Cameras Dialog contains the following controls:
7.2.1.4.7.8.1. Find button and textbox—used to find a camera in the Camera list, as follows:
7.2.1.4.8.1.1. Enter a text string in the textbox.
7.2.1.4.8.1.2. Click the Find button
7.2.1.4.8.1.3. The camera names in the camera list are searched for a match to the text in the textbox.
7.2.1.4.8.1.4. The search starts with the first camera after the currently highlighted camera, if any
7.2.1.4.8.1.5. If a match is found, the camera name is highlighted
7.2.1.4.8.2. Site select control
7.2.1.4.8.2.1. Displays all sites currently loaded into the WatchStation
7.2.1.4.8.2.2. Selecting a site limits the camera list to cameras in the Selected site.
7.2.1.4.8.3. Camera list
7.2.1.4.8.3.1. Lists all cameras in the selected site
7.2.1.4.8.3.2. Cameras can be Dragged from the camera list, and dropped into a Video Pane.
7.2.1.4.9. List Zones Dialog
The List Zones Dialog lists all of the zones devined in the e-Watch system, and provides a convenient way to Drag a zone into a Video Pane. The List Zones Dialog contains the following controls:
7.2.1.4.9.1. Zone list
7.2.1.4.9.1.1. Lists all zones
7.2.1.4.9.1.2. Right click displays a list of cameras in the zone
7.2.1.4.9.1.3. Zones can be Dragged from the zone list, and dropped into a Video Pane.
7.2.1.4.10. Camera Report Dialog
The Camera Report Dialog produces the online Camera Report. The Camera Report can be produced on demand, and can also be scheduled for later execution or for periodic execution.
7.2.1.4.10.1 Camera Report Setup—contains the following controls:
7.2.1.4.10.1.1. From Date and Time
7.2.1.4.10.1.2. Through Date and Time
7.2.1.4.10.1.3. Camera List
7.2.1.4.10.1.3.1. Lists all available cameras
7.2.1.4.10.1.3.2. Left double-click selects or de-selects a camera
7.2.1.4.10.1.4. Select All button—selects all cameras
7.2.1.4.10.1.5. Run button—left click displays the Camera Report Result Dialog
7.2.1.4.10.1.6. Schedule button
7.2.1.4.10.1.6.1. Displays the Camera Report Schedule Dialog
7.2.1.4.10.1.6.2. Available only on named WatchStations
7.2.1.4.10.1.7. Exit button—closes the dialog
7.2.1.4.10.2. Camera Report Schedule Dialog
7.2.1.4.10.2.1. Activate tab—contains the following controls
7.2.1.4.10.2.1.1. Active/Inactive selection
7.2.1.4.10.2.1.2. Continue button—left click changes and closes the dialog
7.2.1.4.10.2.1.3. Cancel button—discards changes and closes the dialog.
7.2.1.4.10.2.2. Time tab—contains the following controls
7.2.1.4.10.2.2.1. From date and time
7.2.1.4.10.2.2.2. Through date and time
7.2.1.4.10.2.2.3. Continue button—left click saves changes and closes the dialog
7.2.1.4.10.2.2.4. Cancel button—discards changes and closes the dialog
7.2.1.4.10.2.3. Frequency tab—contains the following controls:
7.2.1.4.10.2.3.1. Frequency selection, choice of:
7.2.1.4.10.2.3.1.1. Once
7.2.1.4.10.2.3.1.2. Daily 7.2.1.4.10.2.3.1.3. Weekly
7.2.1.4.10.2.3.2. Run date and time, for Once selection
7.2.1.4.10.2.3.3. Run time, for Daily selection
7.2.1.4.10.2.3.4. Day of week and time, for Weekly selection
7.2.1.4.10.2.3.5. Continue button—left click saves changes and closes the dialog
7.2.1.4.10.2.3.6. Cancel button—discards changes and closes the dialog
7.2.1.4.10.3. Camera Report Result Dialog
7.2.1.4.10.3.1. Setup button—re-displays the Camera Report Setup Dialog
7.2.1.4.10.3.2. Exit—closes all Camera Report Dialogs
7.2.1.4.10.3.3. From date and time—display only
7.2.1.4.10.3.4. To date and time—display only
7.2.1.4.10.3.5. Report line—displays the following data
7.2.1.4.10.3.5.1. Camera name
7.2.1.4.10.3.5.2. Activity icons
7.2.1.4.10.3.5.2.1. Black disk represents no activity
7.2.1.4.10.3.5.2.2. Blue disk represents low activity
7.2.1.4.10.3.5.2.3. Red disk represents high activity
7.2.1.4.10.3.5.2.4. Hovering the mouse over the icon displays the From date and time, and To date and time, represented by the icon
7.2.1.4.10.3.5.2.5. Left click on a blue or red icon displays the Camera Report Detail dialog
7.2.1.4.10.3.5.3. Status
7.2.1.4.10.3.5.3.1. Running
7.2.1.4.10.3.5.3.2. Complete
7.2.1.4.10.4. Camera Report Detail Dialog
7.2.1.4.10.4.1. Time tab—contains the following controls:
7.2.1.4.10.4.1.1. From date and time—display only
7.2.1.4.10.4.1.2. To date and time—display only
7.2.1.4.10.4.1.3. Exit button—Left click closes the dialog
7.2.1.4.10.4.2. Stats tab—contains the following controls:
7.2.1.4.10.4.2.1. Number of images
7.2.1.4.10.4.2.2. Average number of images
7.2.1.4.10.4.2.3. Exit button—Left click closes the dialog
7.2.1.4.10.4.3. View tab—contains the following controls
7.2.1.4.10.4.3.1. Report button—Left click displays the Spot Report Dialog
7.2.1.4.10.4.3.2. Images button—Left click switches the WatchStation to Browse Mode, and loads the detail From date and time, To date and time, and camera into the WatchStation for review.
7.2.1.4.10.4.3.3. Exit button—Left click closes the dialog
7.2.1.4.11. Gate Watch Standard Report Dialog
The Gate Watch Standard Report presents information sent from a 3$^{rd}$ party security system to the e-Watch system through the Gate Watch interface.
7.2.1.4.11.1. Gate Watch Standard Report Setup Dialog—contains the following components:
7.2.1.4.11.1.1. From date and time
7.2.1.4.11.1.2. Through date and time
7.2.1.4.11.1.3. Gate Watch source list
7.2.1.4.11.1.3.1. Displays all defined Gate Watch sources
7.2.1.4.11.1.3.2. Left double-click selects or de-selects a source
7.2.1.4.11.1.3.3. Multiple sources may be selected
7.2.1.4.11.1.4. Run button—left click displays the Gate Watch Report Result dialog
7.2.1.4.11.1.5. Exit button—closes the dialog
7.2.1.4.11.2. Gate Watch Standard Report Result Dialog—contains the following components:
7.2.1.4.11.2.1. Setup button—left click re-displays the Gate Watch Standard Report Setup Dialog
7.2.1.4.11.2.2. Ext button—left click closes the dialog.
7.2.1.4.11.2.3. Detail lines
7.2.1.4.11.2.3.1. Left click on a column sorts the detail lines by the values in that column
72.1.4.11.2.3.2.2. Left click on a value filters the detail lines by that data
7.2.1.4.11.2.3.3. Detail lines display the following data:
7.2.1.4.11.2.3.3.1. Event source
7.2.1.4.11.2.3.3.2. Event date and time
7.2.1.4.11.2.3.3.3. Event detail data
7.2.1.4.12. Gate Watch Custom Setup Dialog
If the Gate Watch Custom module is installed, the data fields within the information sent from a 3$^{rd}$ party security system to the e-Watch system, through the Gate Watch interface, can be identified and reported as separate data items.
7.2.1.4.12.1. Field detail line—displays the following data
7.2.1.4.12.1.1. Gate Watch source
7.2.1.4.12.1.2. Report sequence number
7.2.1.4.12.1.3. Field name
7.2.1.4.12.1.4. Field start position
7.2.1.4.12.1.5. Field end position
7.2.14.12.1.6. Device indicator (only one per source)
7.2.1.4.12.2. Add button—left click displays the Add Field dialog
7.2.1.4.12.3. Edit button—left click displays the Edit Field dialog
7.2.1.4.12.4. Delete button—removes the field detail line from the system
7.2.1.4.12.5. OK button—closes the dialog
7.2.1.4.12.6. Add Field/Edit Field dialogs—contain the following components
7.2.1.4.12.6.1. Gate Watch source select list
7.2.1.4.12.6.2. Sequence number
7.2.1.4.12.6.3. Name
7.2.1.4.12.6.4. Start
7.2.1.4.12.6.5. End
7.2.1.4.12.6.6. Device ID checkbox
7.2.1.4.12.6.7. Continue button—left click saves changes and closes the dialog
7.2.1.4.12.6.8. Cancel button—left click discards changes an closes the dialog.
7.2.1.4.13. Gate Watch Custom Report Dialog
The Gate Watch Custom Report presents information sent from a 3$^{rd}$ party security system to the e-Watch system through the Gate Watch interface.
7.2.1.4.13.1. Gate Watch Custom Report Setup Dialog—contains the following components:
7.2.1.4.13.1.1. From date and time
7.2.1.4.13.1.2. Through date and time
7.2.1.4.13.1.3. Gate Watch source list 7.2.1.4.13.1.3.1. Displays all defined Gate Watch sources
7.2.1.4.13.1.3.2. Left double-click selects or de-selects a source
7.2.1.4.13.1.3.3. Only one source may be selected per report
7.2.1.4.13.1.4. Run button—left click displays the Gate Watch Report Result dialog
7.2.1.4.13.1.5. Exit button—closes the dialog
7.2.1.4.13.2. Gate Watch Custom Report Result Dialog—contains the following components:
7.2.1.4.13.2.1. Setup button—left click re-displays the Gate Watch Custom Report Setup Dialog.
7.2.1.4.13.2.2. Exit button—left click closes the dialog
7.2.1.4.13.2.3. Detail lines
7.2.1.4.13.2.3.1. Left click on a column sorts the detail lines by the values in that column
7.2.1.4.13.2.3.2. Left click on a value filters the detail lines by that value.
7.2.1.4.13.2.3.3. Right click on a value displays the Gate Watch Event Details dialog
7.2.1.4.13.2.3.4. Detail lines display the following data:
7.2.1.4.13.2.3.4.1. Event source
7.2.1.4.13.2.3.4.2. Event date and time
7.2.1.4.13.2.3.4.3. Event detail data as defined in the Gate Watch Custom Setup Dialog for the selected source
7.2.1.4.13.3. the Gate Watch Event Details Dialog
7.2.1.4.13.3.1. Detail data fields, as defined in the Gate Watch Custom Setup Dialog for the selected source
7.2.1.4.13.3.2. Show Video—left click causes the following behavior:
7.2.1.4.13.3.2.1. Switches the WatchStation to Browse Mode.
7.2.1.4.13.3.2.2. Reconfigures the Video Window to four Video Panes
7.2.1.4.13.3.2.3. Displays the images from the four cameras closest to the device in the Video Panes.
7.2.1.4.13.3.2.4. Displays the Gate Watch Event Details dialog
7.2.1.4.13.3.3. Exit—left click closes the dialog
7.2.1.4.14. Camera Control Dialog
The Camera Control Dialog is displayed in the center of the Control Window. It contains components used to control the selected camera. The components available depends on what type of camera or encoder is selected.
7.2.1.4.14.1. Busy indicator—provides a visual indication of the status of the connection to the e-Watch camera or encoder
7.2.1.4.14.1.1. Green color indicates ready for command
7.2.1.4.14.1.2. Yellow color indicated busy executing command
7.2.1.4.14.2. Standard Controls—the following controls are available for all e-Watch cameras and encoders:
7.2.1.4.14.2.1. Brightness Slidebar
7.2.1.4.14.2.2. Contrast Slidebar
7.2.1.4.14.2.3. Saturation Slidebar
7.2.1.4.14.2.4. Hue Slidebar
7.2.1.4.14.3. Sony FCB-EX48 Controls—the following additional controls are available for e-Watch cameras equipped with a Sony FCB-EX48 camera:
7.2.1.4.14.3.1. Zoom Slidebar
7.2.1.4.14.3.2. Auto Focus Button
7.2.1.4.14.3.3. Focus Slidebar
7.2.1.4.14.3.4. Auto Iris Button
7.2.1.4.14.3.5. Iris Slidebar
7.2.1.4.14.3.6. Auto Gain Button
7.2.1.4.14.3.7. Gain Slidebar
7.2.1.4.14.3.8. Auto Shutter Button
7.2.1.4.14.3.9. Shutter Slidebar
7.2.1.4.14.3.10. Aperture Slidebar
7.2.1.4.14.3.11. Backlight Button
7.2.1.4.14.4. Sony FCB-EX48 Low Light Controls—the following additional controls are available for e-Watch cameras equipped with a Sony FCB-EX48 camera with the IR Cut Filter:
7.2.1.4.14.4.1. Low Light Button—toggles camera between normal and low-light operating mode
7.2.1.4.14.5. Pan/Tilt Controls—The following additional controls are available for e-Watch cameras or encoders connected to a Pan/Tilt mechanism:
7.2.1.4.14.5.1. Pan/Tilt Control
7.2.1.4.14.6. Pelco Spectra II Controls—The following additional controls are available for e-Watch encoders connected to a Pelco Spectra II Dome Camera:
7.2.1.4.14.6.1. Zoom in Button
7.2.1.4.14.6.2. Zoom Out Button
7.2.1.4.14.6.3. Zero Pan Button
7.2.1.4.14.6.4. Flip Button
7.2.1.4.14.6.5. Reset Camera Button
7.2.1.4.14.6.6. Auto Focus On Button
7.2.1.4.14.6.7 Auto Focus Off Button
7.2.1.4.14.6.8. Focus Near button
7.2.1.4.14.6.9. Focus Far Button
7.2.1.4.14.6.10. Backlight Compensation On Button
7.2.1.4.14.6.11. Backlight Compensation Off Button
7.2.1.4.14.6.12. Preset Buttons (20)
7.2.1.4.14.6.12.1. Left click causes camera to go to preset position
7.2.1.4.14.6.12.2. Right click displays a menu dialog with the Following options
7.2.1.4.14.6.12.2.1. Set Preset—Sets the presets to the current position
7.2.1.4.14.6.12.2.2. Go To Preset—Causes the camera to go to the preset position
7.2.1.4.14.6.13. Zoom Speed Selection Buttons (4)
7.2.1.4.14.6.14. Focus Speed Selection Buttons (4)
7.2.1.4.14.6.15. Pattern Control Buttons
7.2.1.4.6.15.1. Start—Starts recording the pattern
7.2.1.4.14.6.15.2. Stop—Stops recording or running the pattern
7.2.1.4.14.6.15.3. Run—Runs the pattern
7.2.1.4.14.7. Close Button—closes the dialog
7.2.1.4.15. Logon Dialog
The Logon Dialog presents an interface for logging on as a different user, and to permit the current user to change the password.
7.2.1.4.15.1. Logon Tab—contains the following controls:
7.2.1.4.15.1.1. User—User ID for logon
7.2.1.4.15.1.2. Password: Password for logon
7.2.1.4.15.1.3. Load last settings checkbox
7.2.1.4.15.1.4. Continue Button—left click performs the logon and closes the dialog
7.2.1.4.15.1.5. Cancel Button—left click closes the dialog
7.2.1.4.15.2. Password Tab—contains the following controls:
7.2.1.4.15.2.1. Current password
7.2.1.4.15.2.2. New password 7.2.1.4.15.2.3. New password confirmation
7.2.1.4.15.2.4. Continue Button—left click changes the password and closes the dialog
7.2.1.4.15.2.5. Cancel Button—left click closes the dialog
7.2.1.4.16. Sites Dialog
The Sites Dialog provides an interface for loading sites into the WatchStation.
7.2.1.4.16.1. Sites List—Displays the names of all sites defined on the local e-Watch Server
7.2.1.4.16.2. Clear Current Settings Button
7.2.1.4.16.2.1. If checked, all current sites and video streams are unloaded from the WatchStation before loading the selected site.
7.2.1.4.16.2.2. If unchecked, current sites and video streams are retained when loading the selected site and the selected site is appended to the end of the Site Selection control in the Map Window.
7.2.1.4.16.3. Load Button—Left click loads the selected site and closes the dialog.
7.2.1.4.16.4. Cancel Button—left click closes the dialog.
7.2.1.4.17. Presets Dialog
The Presets Dialog provides an interface for saving and restoring WatchStation user interface settings.
7.2.1.4.17.1. Save Tab—contains the following controls:
7.2.1.4.17.1.1. Preset name
7.2.1.4.17.1.2. OK Button—Left click saves the current WatchStation user interface settings and closes the dialog
7.2.1.4.17.1.3. Cancel Button—Left click closes the dialog.
7.2.1.4.17.2. Load Tab—contains the following controls:
7.2.1.4.17.2.1. Preset list—displays the names of all saves presets.
7.2.1.4.17.2.2. OK Button—Left click loads selected preset and closes the dialog.
7.2.1.4.17.2.3. Cancel Button—Left click closes the dialog.
7.2.1.4.17.2.4. Delete Button—Left click removes the selected preset from the system and closes the dialog.
7.2.2. Browse Mode
Browse Mode provides the interface for reviewing images that have been stored on the e-Watch Server. Browse mode can be entered by clicking the Browse button in the Control Window, and by clicking the View Images buttons in several Live Mode dialogs.
7.2.2.1. Map Window—The Map Window in Browse Mode provide the same functions as the map Window in Live mode, except that the context menus are disabled.
7.2.2.2. Video Window—The Video Window in Browse Mode provide the same functions as the Video Window in Live mode, except that:
7.2.2.2.1. The context menus are disabled
7.2.2.2.2. The Video Panes display stored images rather than real-time images.
7.2.2.3. Control Window—The Control Window contains the following controls:
7.2.2.3.1. Live button—switches the WatchStation to Live Mode.
7.2.2.3.2. Browse button—does nothing in Browse Mode.
7.2.2.3.3. T-1 Hour button—left click sets the Start and End date/time controls:
7.2.2.3.3.1. Start control is set to current date and time less 1 hour
7.2.2.3.3.2. End control is set to current date and time.
7.2.2.3.4. JPEG button—left click causes stored JPEG images to be displayed.
7.2.2.3.5. MPEG button—left click causes stored JPEG images to be displayed.
7.2.2.3.5.1. The highest resolution MPEG available shall be displayed
7.2.2.3.5.2. Motion JPEG shall be displayed in MPEG mode if no MPEG video is available
7.2.2.3.5.3. JPEG shall be displayed in MPEG mode if no MPEG or Motion JPEG video is available
7.2.2.3.6. Time button—left click causes image playback to proceed in time sequence.
7.2.2.3.7. Image button—left click causes time periods during which there is no motion detected to be skipped during replay.
7.2.2.3.8. Prev button—left click causes replay to be stepped backward to previous recorded image.
7.2.2.3.9. Play button—left click starts image playback.
7.2.2.3.10. Next button—left click causes replay to be stepped forward to the next recorded image.
7.2.2.3.11. Start date/time control—displays or sets the replay start date and time.
7.2.2.3.12. Curr date/time control—displays the current replay date and time.
7.2.2.3.13. End date/time control—displays or sets the replay end date and time.
7.2.2.3.14. Replay slidebar
7.2.2.3.14.1. Left arrow—left click causes relay to be stepped backward to the next recorded image.
7.2.2.3.14.2. Right arrow—left click causes replay to be stepped forward to the next recorded image.
7.2.2.3.14.3. Left click on slidebar causes the current replay date and time to be set to the date and time represented by that position on the slidebar.
7.2.2.3.14.4. Slider
7.2.2.3.14.4.1. Advances along the slidebar during replay to represent the current replay date and time.
7.2.2.3.14.4.2. Can be Dragged to a new position on the slidebar, which causes the current replay date and time to be set to the date and time represented by that position on the slidebar.
7.2.2.3.15. Replay Speed slidebar (JPEG replay only)
7.2.2.3.15.1. Left arrow—left click causes replay to be slower.
7.2.2.3.15.2. Right arrow—left click causes replay to be faster.
7.2.2.3.15.3. Slider—Can be Dragged to a new position on the slidebar to change the replay speed to the speed represented by that position on the slidebar.
7.2.2.3.16. Video Size (MPEG replay only)
7.2.2.3.16.1. 1×—Video displayed in original size, or as large as the Video Panes will allow, whichever is smaller.
7.2.2.3.16.2. 2×—Video is displayed in double original size, or as large as Video Panes will allow, whichever is smaller.
7.2.2.3.16.3. Full—Video is displayed as large as the Video Panes will allow.
7.2.2.3.17. Region Of Interest (ROI) Filter checkbox
7.2.2.3.17.1. If unchecked, ROI filter is deactivated.
7.2.2.3.17.2. If checked, ROI filter is activated.
7.2.2.3.17.2.1. ROI selection mask can be drawn on any Video Pane by Clicking or Dragging the mouse.

7.2.2.3.17.2.2. Replay will be limited to time periods during which motion is detected within unmasked regions.
7.2.3. Permissions
7.2.3.1. User permissions are determined by the authority level assigned to the user
7.2.3.2. User level permits:
7.2.3.2.1. Configuring the Map Window, Video Window and secondary screens
7.2.3.2.2. Viewing real-time video streams.
7.2.3.2.3. Operating camera controls.
7.2.3.3. Investigator level permits:
7.2.3.3.1. All User level permissions.
7.2.3.3.2. Using Browse Mode.
7.2.3.4. Administrator level permits:
7.2.3.4.1. All investigator permission.
7.2.3.4.2. Using setup dialogs.
7.2.4. Popup Alerts
Popup Alert windows may appear on the WatchStation to report a camera or device Alarm, or to report a problem detected by the e-Watch Server. Other popul messages may be displayed from time to time to provide the operator with information about the status of the WatchStation.
7.2.4.1. The WatchStation shall display up to ten popup windows.
7.2.4.2. If ten popup windows are currently displayed and another alert is received, the oldest popup window shall be closed before the new alert is displayed.
7.2.4.3. Popup Alarms display the following components:
7.2.4.3.1. Alert type description
7.2.4.3.2. Alert source
7.2.4.3.3. Alert date and time
7.2.4.3.4. Remove button (unable to ping camera only)—left click causes the camera to be removed from the system's camera monitor queue; the camera will not be checked again until it reconnects to the e-Watch Server.
7.2.4.3.5. Close button—closes the dialog
7.2.5. e-Watch Help
7.2.5.1. Displays the e-Watch online documentation.
7.2.5.2. e-Watch Help can be displayed by:
7.2.5.2.1. Left clicking the Help button in the Control Window
7.2.5.2.2. Pressing the F2 key
7.2.5.3. e-Watch Help shall be a compiled HTML file
7.2.6. Filter Installation Dialog
7.2.6.1. The WatchStation detects the current version of the filter program installed on the WatchStation computer, and the current version available from a e-Watch.
7.2.6.2. If the current version available from e-Watch is newer than the version installed on the WatchStation computer, a dialog is displayed to offer the opportunity to download and install the newer version.
7.2.6.3. The filter download dialog can also be displayed by pressing the F4 key.
7.2.6.4. If the filter server cannot be located, it shall be possible to disable automatic filter detection (for users behind firewalls).
7.2.6.5. If filter detection is disabled, pressing F4 in the Monitor Station window shall reactivate automatic filter detection.

8. SECONDARY SCREENS

Secondary screens extend the number of video panes that can be viewed by a WatchStation. The secondary screens are controlled from the primary screen.

8.1. No direct user interaction with secondary screens shall be possible or necessary
8.2. All display requirements of the WatchStation Video Window described above shall apply to secondary screens
8.3. Secondary screens shall automatically detect the installed filter versions
8.4. Secondary screens shall automatically download newer filter versions

9. e-WATCH WATCHBOOK

The e-WatchBook is a specialized WatchStation that is specifically designed for wireless portability. The e-Watch WatchBook is started from Microsoft Internet Explorer by entering a special URL in the address window. The e-Watch WatchBook software is organized as a Logon Screen and a Monitor Screen.

The Logon Screen is presented first. If a user successfully logs on, the Monitor Screen is presented.
9.1 Logon Screen
9.1.1. The URL points to logon.asp?station=mobile
9.1.2. The following interface controls are presented:
9.1.2.1. User ID textbox
9.1.2.2. Password textbox
9.1.2.3. Logon button
9.1.3. Pressing the Enter key is equivalent to clicking the Logon button
9.2. Monitor Screen The monitor screen provides all of the user interface controls required to operate the WatchBook. The screen is organized as two windows. The Control Window is positioned on the left side of the Monitor Screen and displays operating controls. The Video Window is positioned on the right side of the Monitor Screen and displays images.

The Monitor Screen operates in two distinct modes, Live Mode and Browse Mode. Live Mode is used to view real-time images. Browse Mode is used to retrieve and view images stored on the e-Watch Server.

A computer pointing device is used extensively to interact with the WatchBook. The description of the WatchStation refers to the following pointing device actions:
Left Click—one click with the left pointing device button
Left Double-Click—two clicks with the left pointing device button in rapid succession
Right Click—one click with the right pointing device button
Drag—pressing and holding the left pointing device button, then moving the cursor
Drop—releasing the left pointing device button after performing a Drag
9.2.1. Live Mode
Live Mode provides the interface for viewing camera video in real time and for controlling cameras.
9.2.1.1. Live button—does nothing in live mode
9.2.1.2. Browse button—switches WatchBook to Browse Mode
9.2.1.3. Site select control
9.2.1.3.1. Displays the names of all sites
9.2.1.3.2. Selected a site from the Site select control causes the cameras in the selected site to be displayed in the camera list
9.2.1.4. Camera list
9.2.1.4.1. Displays the names of all cameras in the selected site.
9.2.1.4.2. Left double-click on a camera name causes the video from the camera to be displayed in the Video Window.

9.2.1.4.3. Alarmed cameras are highlighted in red
9.2.1.5. Zoom to Alarm Checkbox
92.1.5.1. When unchecked, receipt of an alert will not cause the WatchBook to perform Zoom-To-Alarm behavior
9.2.1.5.2. When checked, a receipt of an alert will cause th WatchBook to display the video from the alarmed camera in the Video Window
9.2.1.6. QSIF Button—Left click causes the following:
9.2.1.6.1. QSIF buffoon gains an inset appearance
9.2.1.6.2. SIF button gains an outset appearance
9.2.1.6.3. QSIF video is displayed in the Video Window
9.2.1.7. SIF Button—Left click causes the following:
9.2.1.7.1. SIF button gains an inset appearance
9.2.1.7.2. QSIF button gains an outset appearance
9.2.1.7.3. SIF video is displayed in the Video Window
9.2.1.8. Battery Life Message—Displays current battery life
9.2.1.9. Start Button—Left click causes video from the camera selected in the camera list to be displayed in the Video Window
9.2.1.10. Stop Button—Left click causes video to stop, and to be removed from the Video Window
9.2.1.11. Show Maps Button—Left click displays the WAtchBook Maps dialog
9.2.1.12. Controls Button—Left click displays the WatchBook Camera Control Dialog
9.2.1.13. Signal Meter—provides a visual indication of the amount of data stored in the WatchBook's data buffer
9.2.1.14. WatchBook Maps Dialog
9.2.1.14.1. Displayed as a floating window initially positioned over the Control Window
9.2.1.14.2. Map Select control
9.2.1.14.2.1. Displays all maps for the selected site
9.2.1.14.2.2. Selecting a map causes the map image to be displayed in the dialog
9.2.1.14.3. Displays any number of object icons.
9.2.1.14.3.1. Hovering the mouse over an object icon displays the name of the object.
9.2.1.14.3.2. Each icon represents one of the following types of object:
9.2.1.14.3.2.1. e-Watch site
9.2.1.14.3.2.1.1. Represented by a target icon
9.2.1.14.3.2.2. e-Watch camera
9.2.1.14.3.2.2.1. Represented by a camera icon
9.2.1.14.3.2.2.2. Icon is normally blue
9.2.1.14.3.2.2.3. Icon blinks red when camera is alarmed
9.2.1.14.3.2.2.4. The direction of the camera icon represents the direction in which the camera is pointed.
9.2.1.14.3.2.2.5. Left double-click causes the video stream from the camera to be displayed in the Video Window
9.2.1.14.3.2.3. Third-party device
9.2.1.14.3.2.3.1. Represented by a door icon
9.2.1.14.3.2.3.1.1. Icon is normally blue
9.2.1.14.3.2.3.1.2. Icon blinks red when device is alarmed
9.2.1.15. WatchBook Camera Control Dialog—available for cameras with a Pan/Tilt option
9.2.1.15.1. Standard Controls
9.2.1.15.1.1. Pan/Tilt Control
9.2.1.15.2. Sony FCB-EX48 Controls—the following additional controls are available for e-Watch cameras equipped with a Sony FCB-EX48 camera:
9.2.1.15.2.1. Zoom Slidebar
9.2.1.15.2.2. Auto Focus Button
9.2.1.15.2.3. Focus Slidebar
9.2.1.15.3. Pelco Spectra II Controls—The following additional controls are available for e-Watch encoders connected to a Pelco Spectra II Dome Camera
9.2.1.15.3.1. Zoom In Button
9.2.1.15.3.2. Zoom Out Button
9.2.1.15.3.3. Preset Buttons (20)
9.2.1.15.3.3.1. Left click causes camera to go to preset position
9.2.1.15.3.3.2. Right click displays a menu dialog with the following options
9.2.1.15.3.3.2.1. St Preset—Sets the preset to the current position
9.2.1.15.3.3.2.2. Go to Preset—Causes the camera to go to the preset position
9.2.1.15.3.4. Zero Preset Button
9.2.2. Browse Mode
9.2.2.1. Live Button—switches Watchbook to Live Mode
9.2.2.2. Browse Button—does nothing in Browse Mode
9.2.2.3. Hour Button—left click sets the Start and End date/time controls
9.2.2.3.1. Strt control is set to current date and time less 1 hour.
9.2.2.3.2. End control is set to current date and time.
9.2.2.4. JPEG button—left click causes stored JPEG images to be displayed
9.2.2.5. QSIF button—left click causes stored QSIF MPEG videos to be displayed
9.2.2.6. SIF button—left click causes stored SIF MPEG videos to be displayed
9.2.2.7. Prev button—left click causes replay to be stopped backward to the previous recorded image.
9.2.2.8. Play button—left click starts image playback.
9.2.2.9. Next button—left click causes replay to be stepped forward to the next recorded image.
9.2.2.10. Start date/time control—displays or sets the replay start date and time.
9.2.2.11. Curr date/time control—displays the current replay date and time
9.2.2.12. End date/time control—displays or sets the replay end date and time.
9.2.2.13. Replay slidebar
9.2.2.13.1. Left arrow—left click causes relay to be stepped backward to the previous recorded image.
9.2.2.13.2. Right arrow—left click causes replay to be stepped forward to the next recorded image.
9.2.2.13.3. Left click on slidebar causes the current replay date and time to be set to the date and time represented by that position on the slidebar.
9.2.2.13.4. Slider
9.2.2.13.4.1. Advances along the slidebar during replay to represent the current replay date and time.
9.2.2.13.4.2. Can be Dragged to a new position on the slidebar, which causes the current replay date and time to be set to the date and time represented by that position on the slidebar.
9.2.2.14. Replay Speed slidebar (JPEG replay only)
9.2.2.14.1. Left arrow—left click causes replay to be slower.
9.2.2.14.2. Right arrow—left click causes replay to be faster.
9.2.2.14.3. Slider—Can be Dragged to a new position on the slidebar to change the replay speed to the speed represented by that position on the slidebar.
9.2.2.15. Video Size (MPEG replay only)

9.2.2.15.1. 1x—Video is displayed in original size, or as large as the Video Window will allow, whichever is smaller 9.2.2.15.2. 2x—Video is displayed in double original size, or as large as the Video Window will allow, whichever is smaller.

9.2.2.15.3. Full—Video is displayed as large as the Video Window will allow.

9.3 Filter Installation Dialog 9.3.1. The WatchBook shall detect the current version of the filter program installed on the WatchBook computer, and the current version available from e-Watch 9.3.2. If the current version available from e-Watch is newer than the version installed on the WatchBook computer, a dialog shall be displayed to offer the opportunity to download and install the newer version 9.3.3. The filter download dialog shall also be displayed by pressing the F4 key

What is claimed is:

1. A surveillance system having a plurality of video cameras disposed on an Ethernet network and adapted for communicating with the ethernet network, the system comprising:

a plurality of cameras;

a digitizer of each camera, the digitizer being integral in a common housing with the respective camera;

a network interface for each camera, the network interface being integral in a common housing with the respective camera, the network interface being connected to the ethernet network;

each camera communicating with the ethernet network through the network interface;

a plurality of compressors integral in a common housing with each camera in advance of the network interface at each camera, each of the compressors outputting a respective compressed signal, the compressed signals each having at least one characteristic different from other of the compressed signals, the at least one characteristic being selected from among:

image resolution, compression type and compressed bit rate;

the network interface including an IP network stack, the IP network stack being configured to provide a plurality of IP data packets, the plurality of IP data packets conveying the compressed signals;

the camera including memory and a processor associated with the memory;

the camera including timestamp application software stored in the memory and executable upon operation of the processor, the timestamp application software when executed attaching presentation timestamps (PTS's) in I-frame packets of the compressed signals;

a receiver adapted to be connected to the ethernet network to receive the compressed signals at a location remote from the camera, the receiver including:

memory;

a buffering software application stored in memory, the buffering software application including executable steps prescribing:

extracting presentation timestamps (PTS's) from each of a series of received I-frame packets;

adding to extracted presentation timestamps (PTS's) a time offset sufficient to account for worst case network delay, the extracted presentation timestamps (PTS's) and time offset when added providing a series of respective sums;

a video player software application stored in memory, the video player software application when executed playing received compressed signals in series in relation to the sums;

a processor in communication with memory, the processor being operable to execute the executable steps; and the receiver further including the video player software application including a video player time base, the video player time base providing a measure for pacing play of the received compressed signals;

the buffering software application including executable steps prescribing:

the time offset being a predicted delay value (delta T), the predicted delay value (delta T) initially being an estimate of worst case network delay, the extracted presentation timestamps (PTS's) and predicted delay value (delta T) when added providing the series of respective sums;

substituting the respective sums for each presentation timestamp (PTS) to delay playback of each frame by the predicted delay value (delta T);

obtaining a local prediction of delay (local delta T) from the video player time base;

changing the predicted delay value (delta T) by a difference amount, the difference amount being calculated between the predicted delay value (delta T) and the local prediction of delay (local delta T) before adding the predicted delay value (delta T) to a next extracted presentation timestamp (PTS's) extracted from the series of received I-frame packets.

* * * * *